United States Patent
Fukuzawa et al.

(10) Patent No.: US 6,701,132 B1
(45) Date of Patent: Mar. 2, 2004

(54) MOBILE COMMUNICATION SYSTEM, MOBILE STATION, AND BASE STATION THAT CALCULATES DISTANCE FROM MOBILE STATION

(75) Inventors: Shoji Fukuzawa, Fujisawa (JP); Tetsuhiko Hirata, Yokohama (JP); Masashi Yano, Fujisawa (JP); Norihisa Matsumoto, Kawasaki (JP); Toshiro Suzuki, Tama (JP)

(73) Assignee: Hitachi, Ltd. (JP)

(*) Notice: Subject to any disclaimer, the term of this patent is extended or adjusted under 35 U.S.C. 154(b) by 0 days.

(21) Appl. No.: 09/517,483

(22) Filed: Mar. 2, 2000

(30) Foreign Application Priority Data

Jul. 30, 1999 (JP) .......................................... 11-217912

(51) Int. Cl.$^7$ .............................................. H04B 17/00
(52) U.S. Cl. ...................................... 455/67.6; 455/561
(58) Field of Search ................................. 455/403, 422, 455/434, 450, 453, 11.1, 509, 67.6, 550, 560, 561, 242.1, 243.1, 456; 370/508, 519

(56) References Cited

U.S. PATENT DOCUMENTS 6,101,394 A * 8/2000 Illidge ........................ 340/7.25
6,141,332 A * 10/2000 Lavean ........................ 370/208

FOREIGN PATENT DOCUMENTS

| JP | 7181242 | 7/1995 | ............. G01S/5/10 |
| JP | 10322752 | 12/1998 | ............. H04Q/7/34 |

* cited by examiner

*Primary Examiner*—Thanh Cong Le
*Assistant Examiner*—Tu Nguyen
(74) *Attorney, Agent, or Firm*—Sofer & Haroun, LLP

(57) ABSTRACT

A mobile communication system that can obtain mobile station location information repeatedly at short intervals, without depending on whether base stations are synchronous or asynchronous, with lower loads and suppressed use of radio resources. For obtaining location information, a mobile station receives a paging channel periodically sent from a base station (Step 100), obtains the contents and the reception timing of this paging channel. Further, if it is necessary to obtain the transmission timing of the paging channel, that transmission timing is obtained (Steps 105, 106). The propagation delay of the paging channel or propagation delay differences between a plurality of periodic paging channels are calculated from the transmission timing and the reception timing of the paging channel (Step 107). The mobile station location information is calculated from the propagation delay or propagation delay difference, and outputted (Steps 108, 109, 110).

9 Claims, 19 Drawing Sheets

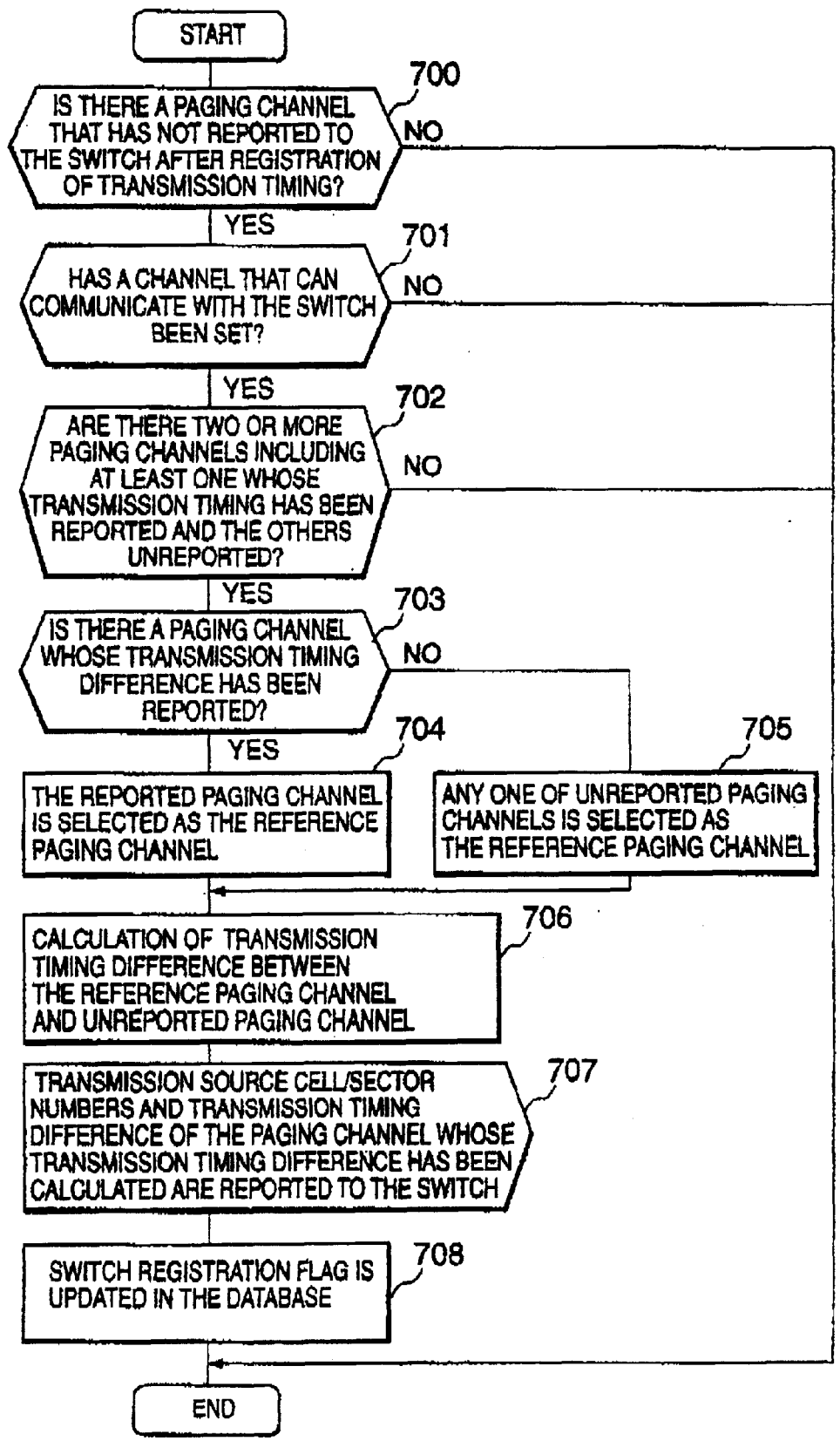

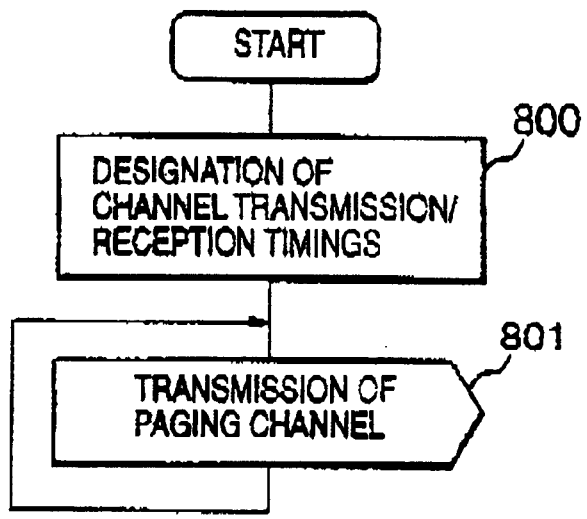
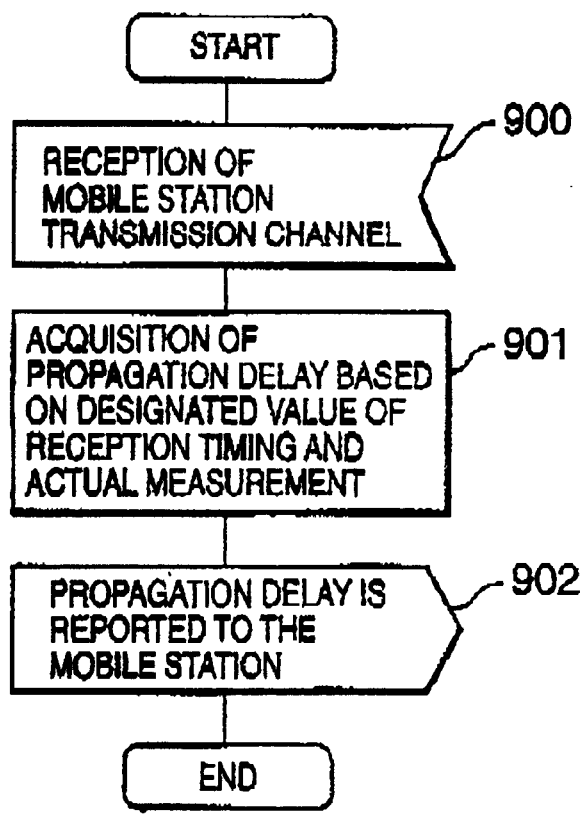

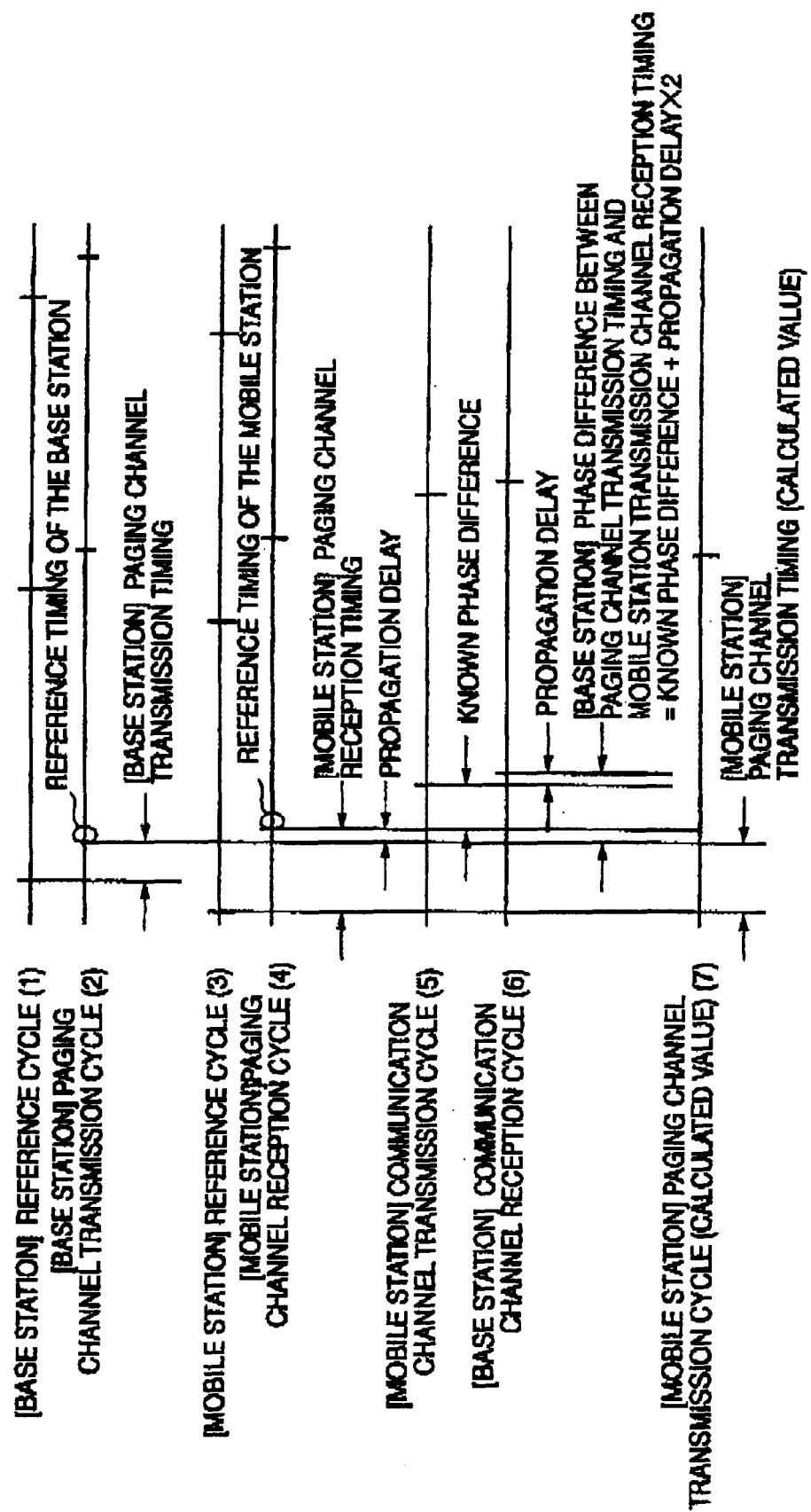

MOBILE COMMUNICATION SYSTEM, MOBILE STATION, AND BASE STATION THAT CALCULATES DISTANCE FROM MOBILE STATION

BACKGROUND OF THE INVENTION

1. Field of the Invention

The present invention relates to a mobile communication system, and in particular to a mobile station that obtains location information by communicating with a base station and a switch, and a base station that calculates distance from a mobile station to which the asynchronous CDMA system is applied.

2. Description of Related Art

Generally, a mobile communication system, represented by a portable telephone system, comprises a mobile station for user to communicate while moving within a radio area or moving from one radio area to another, a base station that forms a radio area by providing a certain area with radio resources for communication, and a switch that forms a communication network by controlling a plurality of base stations and mobile stations in the radio areas of those base stations and connects with other networks including a fixed network. In such a mobile communication system, the base station control function of the switch may be separated from it as a base station control apparatus, which is installed between the base station and the switch. In the following, however, for the sake of convenience of explanation, simply the switch is referred to.

In a mobile communication system, there is a demand for specifying a location of a sender in an emergency or when a mobile station is used illegally. Further, also in ordinary use, it is advantageous to specify a users detailed location, since service such as guidance information can be offered in accordance with that location. Thus, it is very useful to be able to obtain location information of a mobile station.

As a method of obtaining location information of a mobile station, there are mentioned, for example, a method of utilizing a marker embedded in a road or building, and a method of using GPS (Global Positioning System), which is a position system using satellites and used for a car navigation system etc.

However, in the mentioned systems, special devices are required, and communication for a mobile station to obtain location information should be made differently from the ordinary communication, making the processing load relatively large.

As conventional technique that solve the above-mentioned drawbacks for obtaining location information of a mobile station, Japanese Unexamined Patent Application Laid-Open Nos. 7-181242 and 10-322752 are known, for example. These conventional techniques are ones in which location information of a mobile station is obtained by using information on the radio area to which the mobile station belongs and a propagation state of an ordinary channel for mobile communication. These techniques are methods that utilize high-precision timing information in a mobile communication system using a communication channel having that high-precision timing information.

The conventional technique described in the former patent application document 7-181242 is a method in which base stations transmit channels of the same type such that transmission timing differences among base stations are values known in advance, and a mobile station obtains a propagation delay difference for each of plurality of channels by subtracting a transmission timing difference from a reception timing difference, in order to obtain respective differences in distances between the mobile station and the base stations. Further, the conventional technique described in the latter patent application document 10-322752 is a method in which forward-and-return transmission/reception are made between a mobile station and a base station, and the time needed for this transmission-and-reception is measured to obtain a propagation delay and thus to obtain a distance between the mobile station and the base station.

The conventional techniques described in the above two patent application documents premise that a communication channel having high precision timing information is used. As such a representative mobile communication system that uses a communication channel having high precision timing information, a mobile communication system using CDMA (Code Division Multiple Access) is known. CDMA is a technique in which a communication channel is coded with a signal sequence, called a diffusion code, having a change pattern in extremely short times. Accordingly, a communication channel utilizing the CDMA technique has high precision timing information owing to a diffusion code. The CDMA mobile communication system is recently advancing in commercialization, and considered to become the core of International Mobile Telecommunications. Thus, those techniques are very useful as a method of realizing acquisition of location information of a mobile station.

SUMMARY OF THE INVENTION

However, the conventional technique described in the above-described former patent application document 7-181242, i.e., the technique of using transmission channels from a plurality of base stations whose differences in transmission timing are known in advance, has a problem in that its application to a general mobile communication system is difficult.

The reason for it is as follows. Namely, in order that the differences in channel transmission timing among the base stations can be known in advance, it is necessary to satisfy the condition that the mobile communication system is one in which base stations are precisely synchronized with one another and transmit in transmission timing controlled by a switch or the like. However, as a mobile communication system satisfying such a condition, there is only known IS-95, a CDMA mobile communication system standardized in U.S.A., and a general cellular system or the like does not satisfy this condition.

Further, the conventional technique described in the latter patent application document 10-322752, in which a distance between a mobile station and a base station is obtained by measuring a channel propagation delay of transmission/return-reception, has a problem in that it is difficult to apply it to a case in which it is desirable that the latest possible location information can be obtained at all times such as a guide information service according to a current position. This is because, in order to obtain location information of a mobile station, this method must carry out transmission and return reception every time location information is obtained, and, when location information of a mobile station is updated frequently, the processing load of the system as a whole and use of radio resources become large.

Thus, as described above, the method of the conventional technique is limited in its conditions of the applicable mobile communication system, or its processing load and use of a radio resources become large in a case of frequent use.

An object of the present invention is to provide a mobile communication system that solves the above-described problems of the conventional techniques and can obtain a location of a mobile station without requiring a special condition such as synchronization of a plurality of base stations.

Further, another object of the present invention is to provide a mobile station that can calculate its location and a base station that informs the mobile station about a distance between that base station and the mobile station, without requiring a special condition such as synchronization of a plurality of base stations.

Further, another object of the present invention is to provide a mobile communication system in which location information of a mobile station can be frequently obtained, a mobile station that can calculate its location, and a base station that can inform the mobile station about a distance between that base station and the mobile station, while suppressing the processing load and use of radio resources.

According to the present invention, those objects are achieved by providing a following mobile communication system. Namely, the present invention provides a mobile communication system comprising mobile stations, base stations are switches, wherein:

each of the mobile and base stations has means for retaining and updating a cycle that is common to said mobile and base stations although a phase of said cycle is optional for each station, as a reference cycle;

each of the base stations has means for continuing to transmit a paging channel that has a periodic structure of a same cycle as the reference cycle, designating a phase difference from a phase of the reference cycle of the base station, and including information indicating a transmission source in that paging channel;

each of the mobile stations comprises:

means for receiving the paging channel from the base station, for obtaining a phase difference between a phase of the reference cycle of the mobile station itself and a phase of a cycle of the paging channel at a time of the receiving, as a reception timing of the received paging channel, and for obtaining information that is included in the paging channel and indicates a transmission source of the paging channel;

means for obtaining information on a paging channel transmission timing, which is a phase difference between the phase of the reference cycle of the mobile station itself and a phase of the cycle of the paging channel of the base station at a time of transmission, and for recording the obtained information together with the information indicating the transmission source;

means for obtaining information on a paging channel propagation delay, from the information on the reception timing and transmission timing of the paging channel, when a paging channel for which information on a transmission timing is retained in advance, or when information on the transmission timing of the received paging channel is newly obtained; and means for obtaining information on a distance between the mobile station itself and the base station, based on the information on the propagation delay of the paging channel and the information indicating the transmission source of the paging channel.

Measurement results obtained from processing required for ordinary communication control for the mobile communication system, such as measurement of a paging channel reception timing and measurement of a propagation delay between a mobile station and a base station, may be diverted to the above-described procedures.

Accordingly, the present invention can obtain location information of a mobile station, with relatively lower processing loads. Further, variations of the above-mentioned means may be used in accordance with setting status of a communication channel from moment to moment. By this, the necessity of dedicated radio resources can be decreased.

BRIEF DESCRIPTION OF THE DRAWINGS

FIG. 7 is a flowchart for explaining a procedure for recording paging channel transmission timing difference in a mobile station according to an embodiment of the present invention;

FIG. 8 is a flowchart for explaining a procedure for transmitting a paging channel in a base station according to an embodiment of the present invention;

FIG. 9 is a flowchart for explaining a base station's procedure corresponding to the mobile station's procedure shown in FIG. 2;

FIG. 20 is a timing chart for explaining a relation between transmission and reception timings for respective channels and for explaining a principle of obtaining channel propagation delay differences and transmission timing.

DESCRIPTION OF THE PREFERRED EMBODIMENTS

Figure 1:
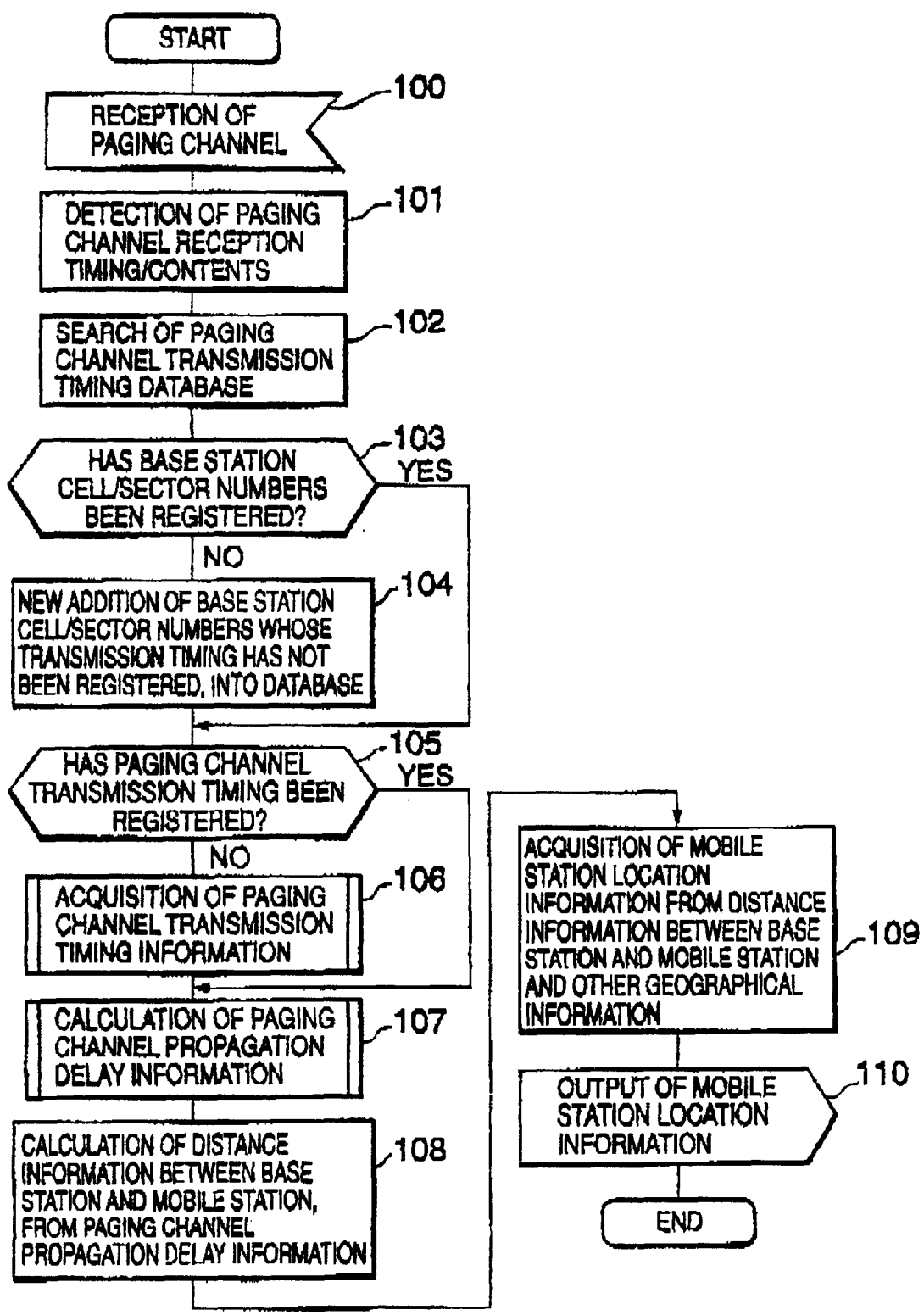
FIG. 1 is a flowchart for explaining a main procedure in a mobile station according to an embodiment of the present invention.

In the following, embodiments of the mobile communication system according to the present invention will be described in detail referring to the drawings.

Figure 2:
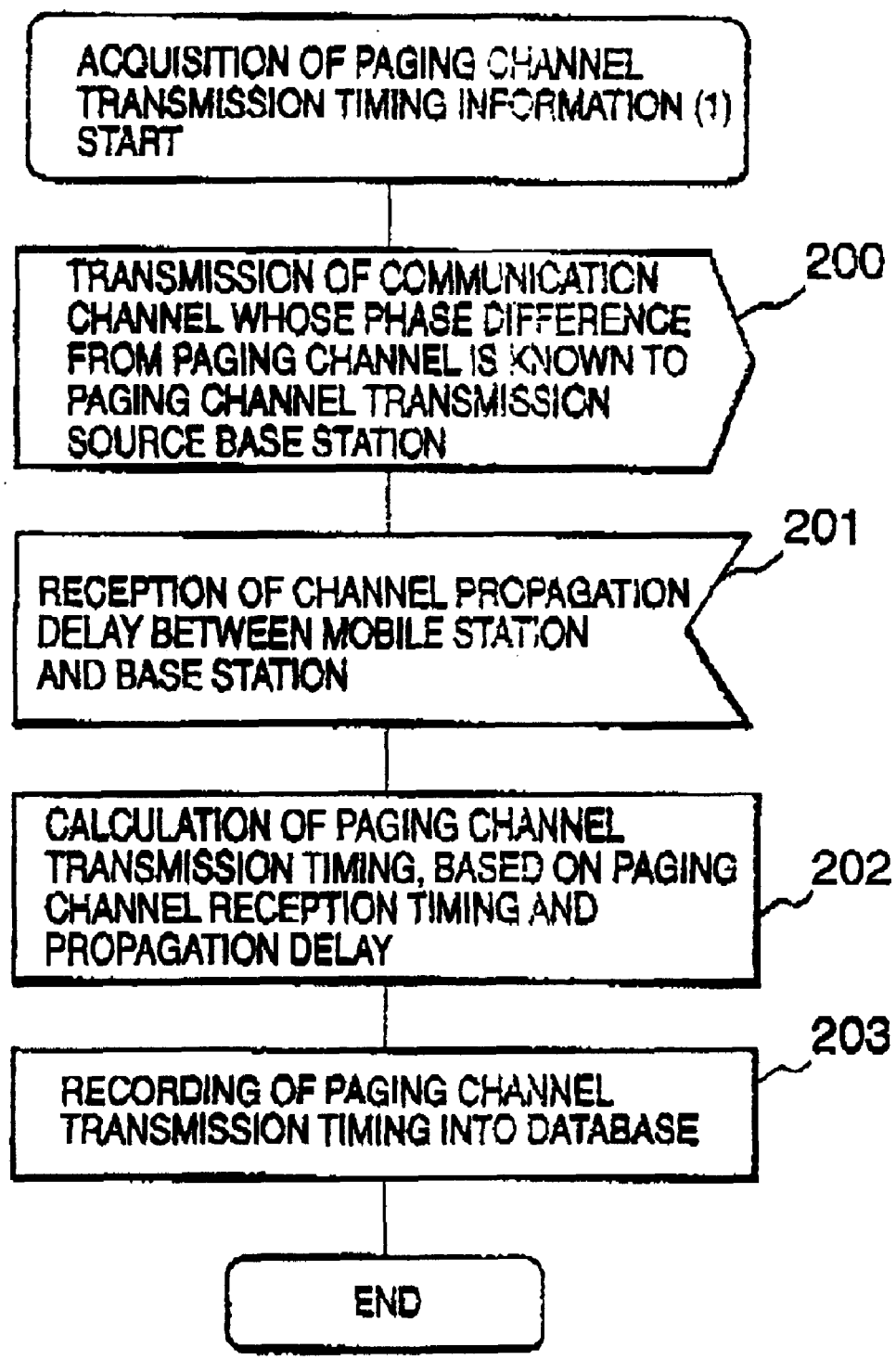
FIG. 2 is a flowchart for explaining an example of a procedure for obtaining paging channel transmission timing in FIG. 1.
Figure 3:
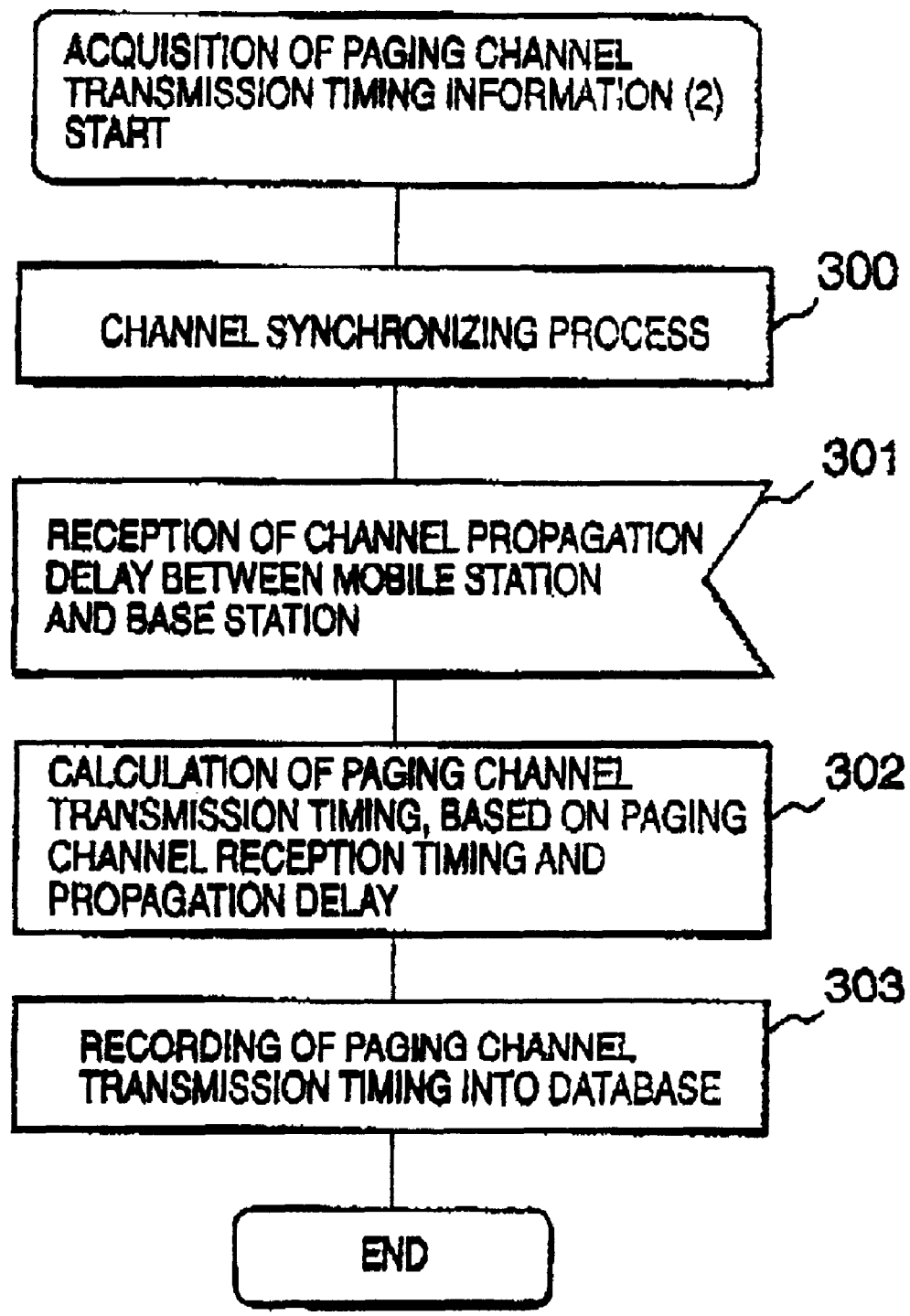
FIG. 3 is a flowchart for explaining an example of a procedure for obtaining paging channel transmission timing in FIG. 1.
Figure 4:
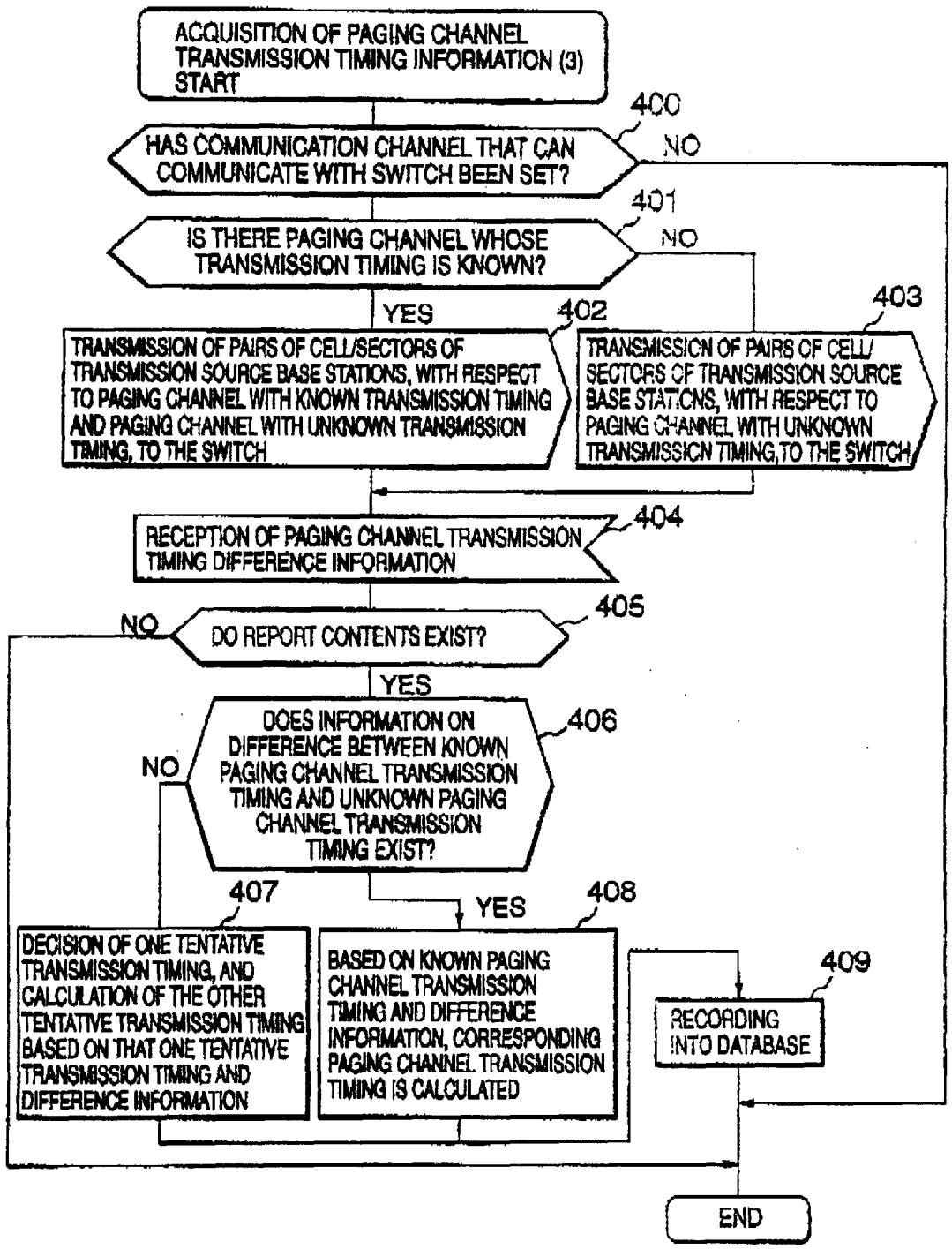
FIG. 4 is a flowchart for explaining an example of a procedure for obtaining paging channel transmission timing in FIG. 1.
Figure 5:
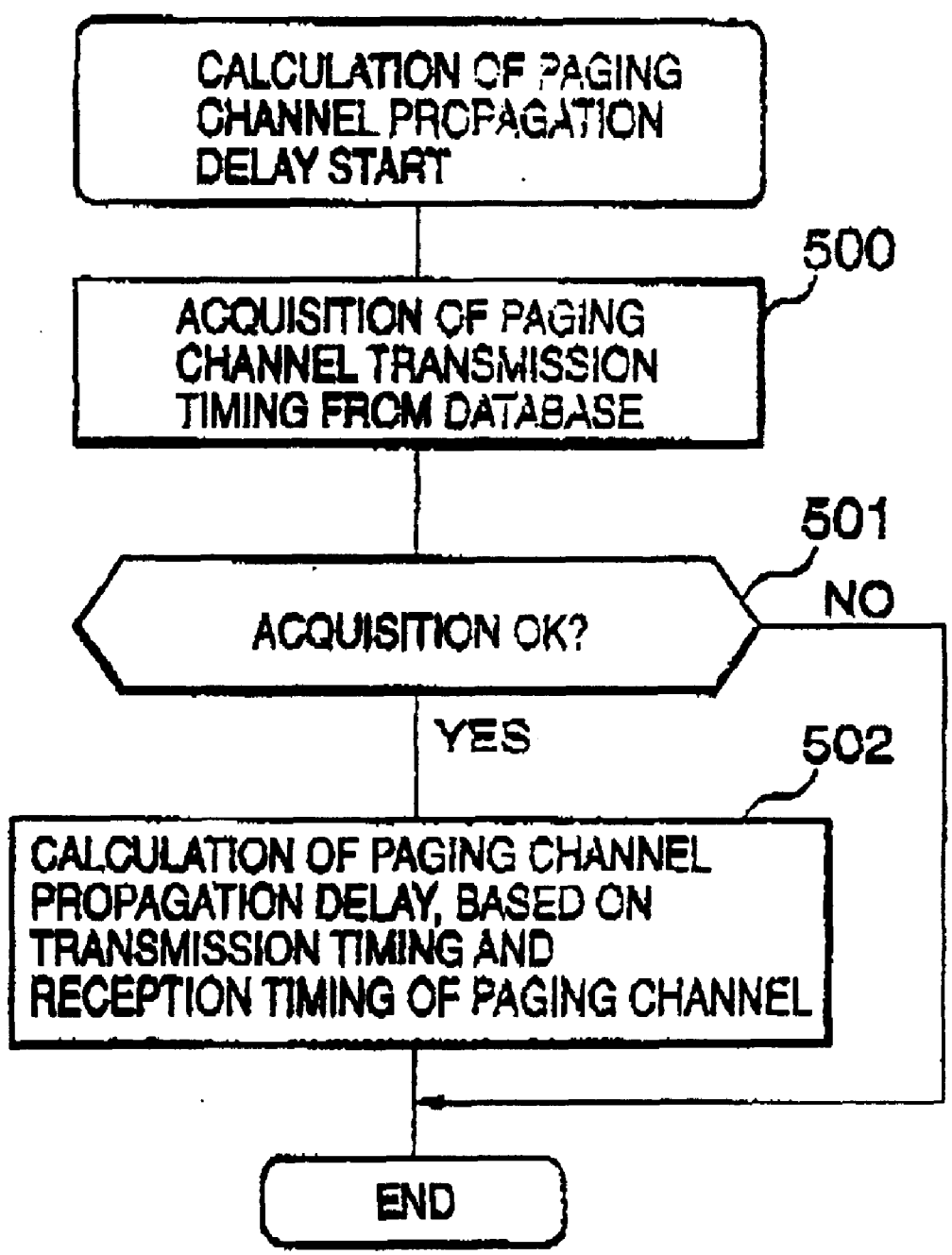
FIG. 5 is a flowchart for explaining an example of a procedure for calculating paging channel propagation delay information in FIG. 1.
Figure 6:
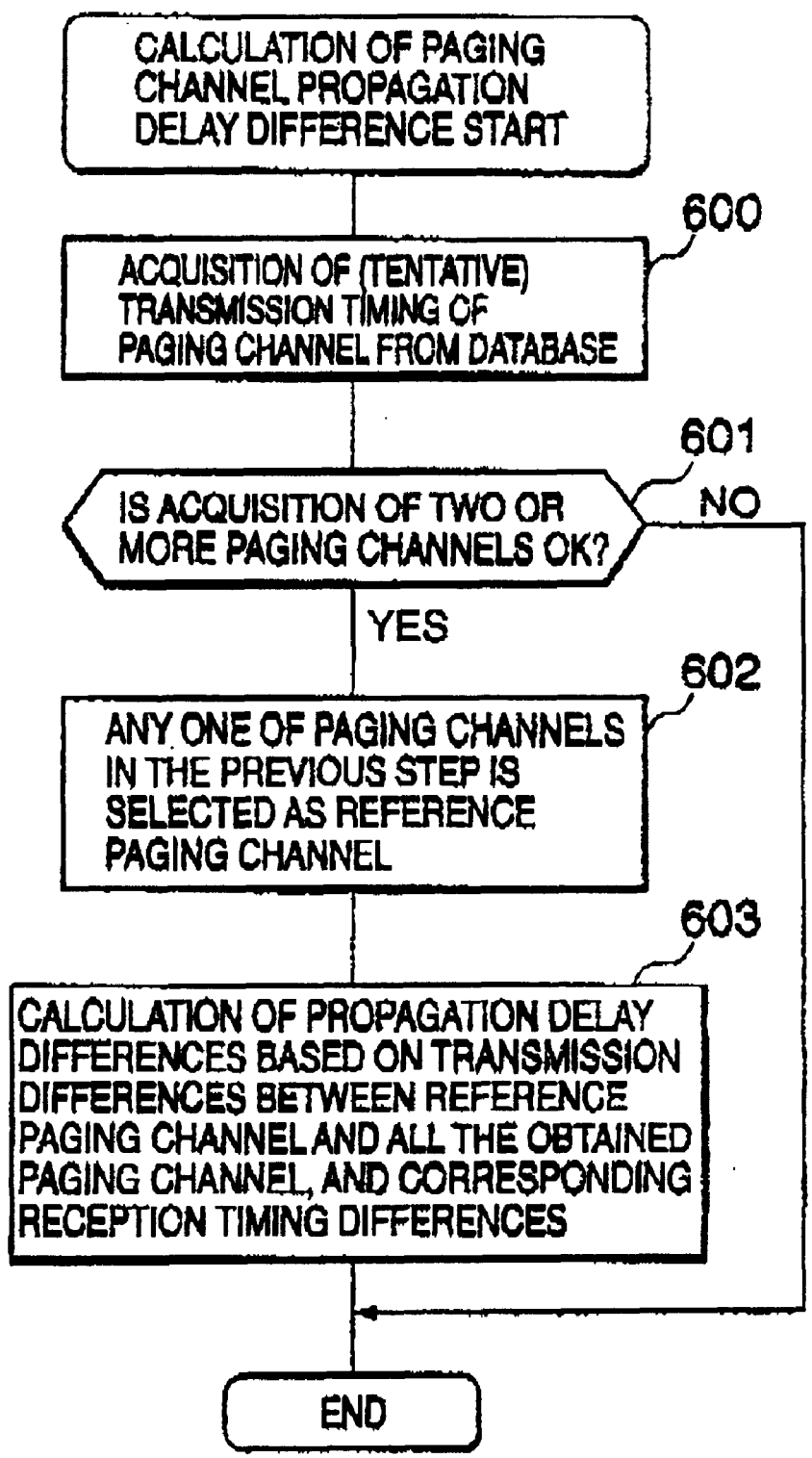
FIG. 6 is a flowchart for explaining an example of a procedure for calculating paging channel propagation delay information in FIG. 1.
Figure 10:
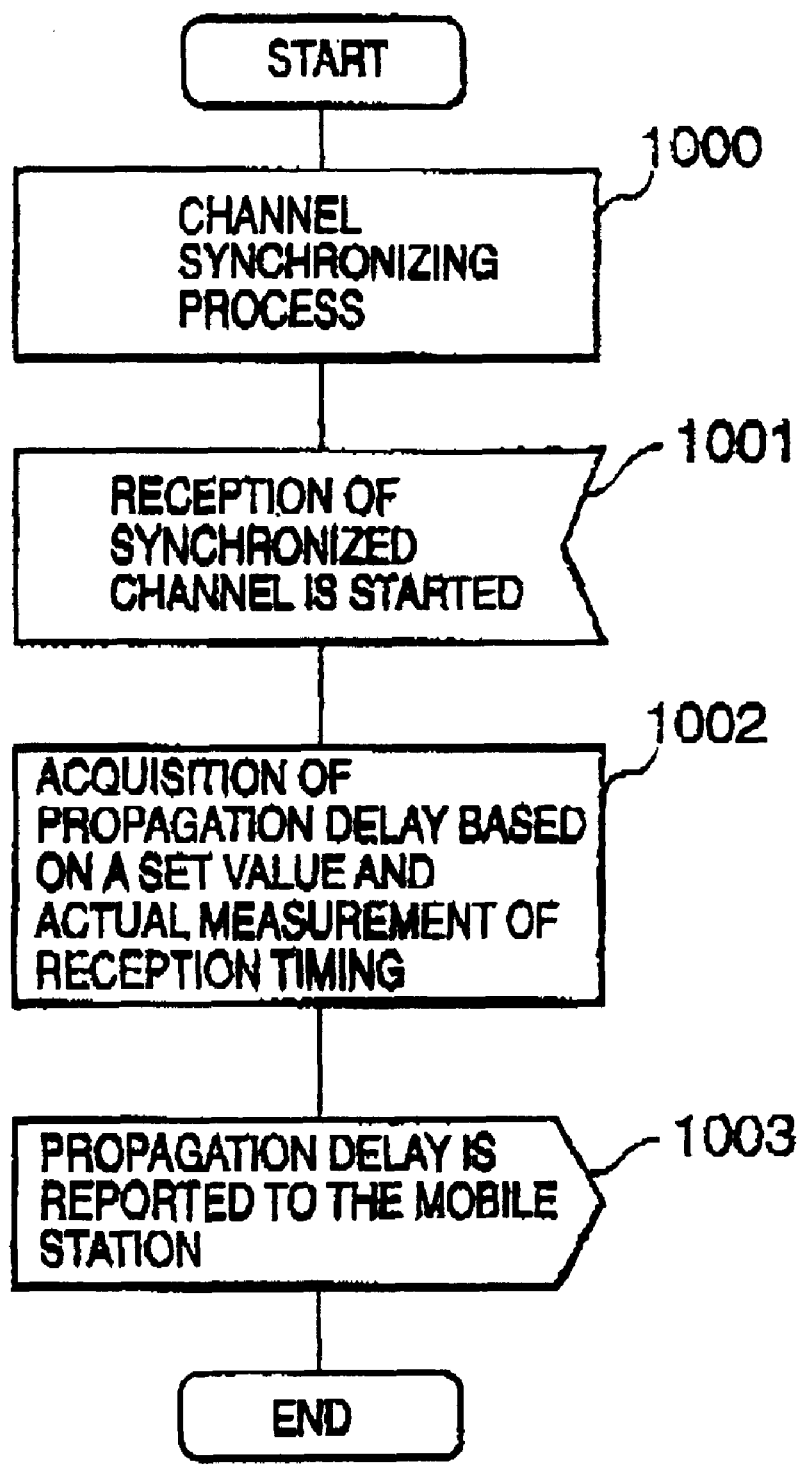
FIG. 10 is a flowchart for explaining a base station's procedure corresponding to the mobile station's procedure shown in FIG. 3.
Figure 11:
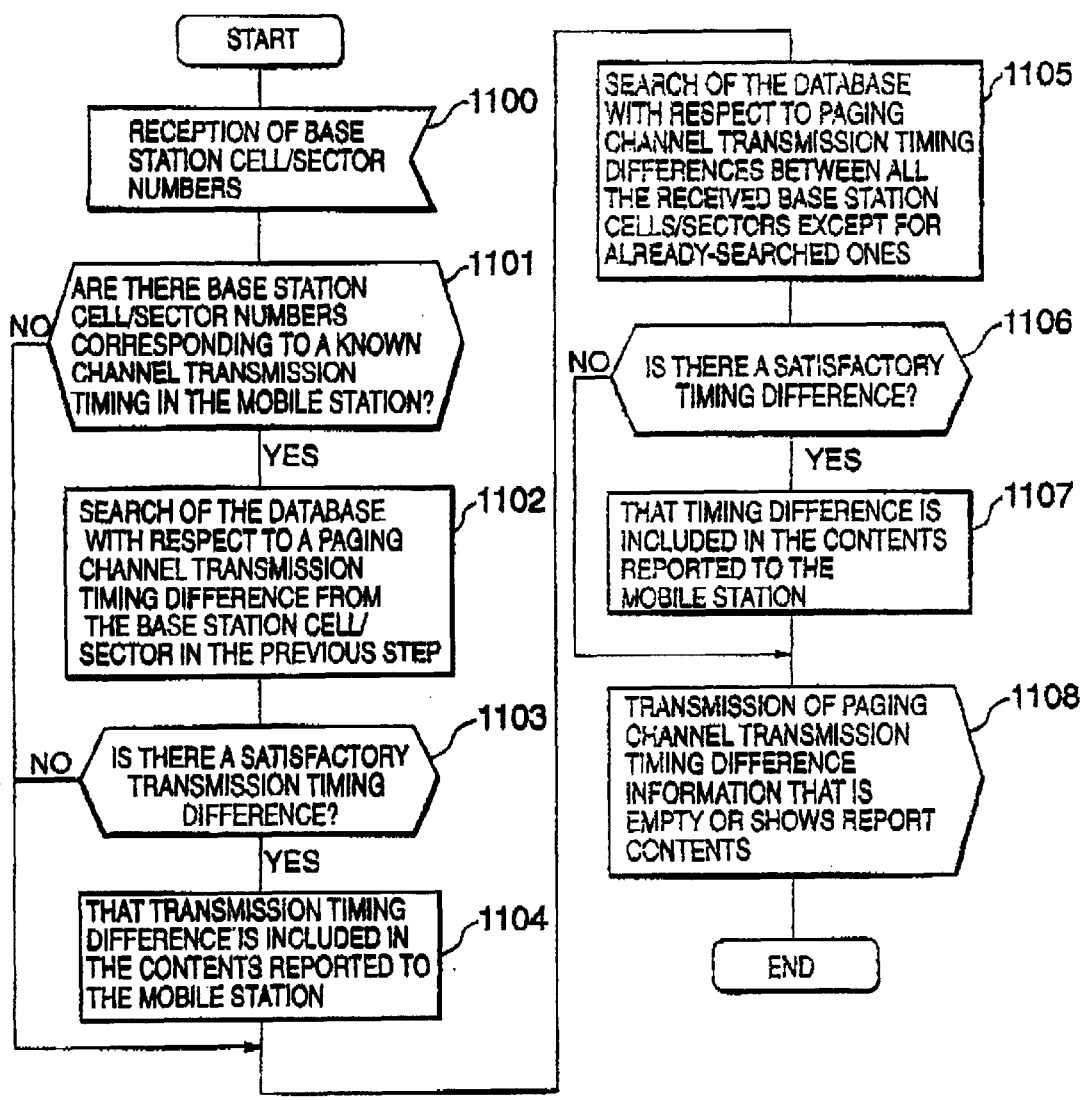
FIG. 11 is a flowchart for explaining a base station's procedure corresponding to the mobile station's procedure shown in FIG. 4.
Figure 12:
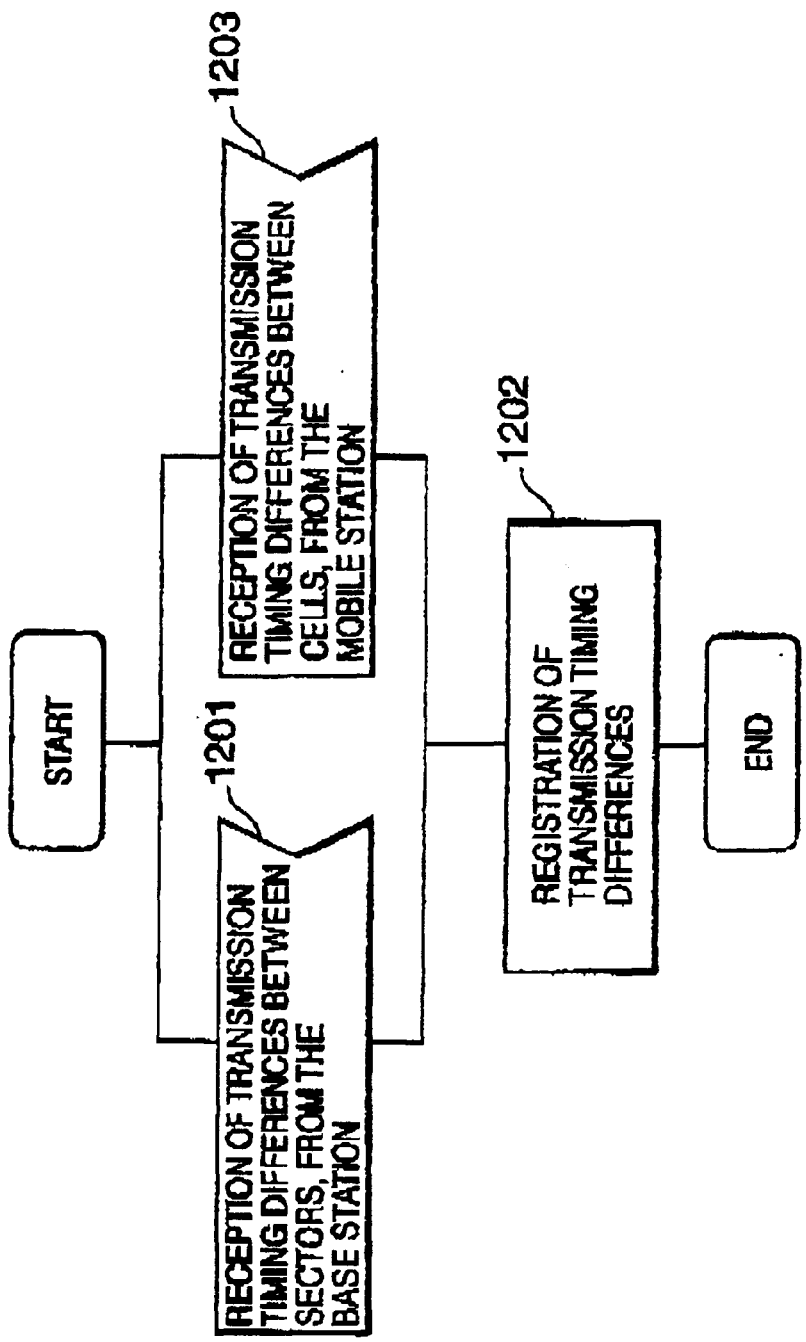
FIG. 12 is a flowchart for explaining a switch's procedure corresponding to the mobile station's procedure shown in FIG. 7.
Figure 13:
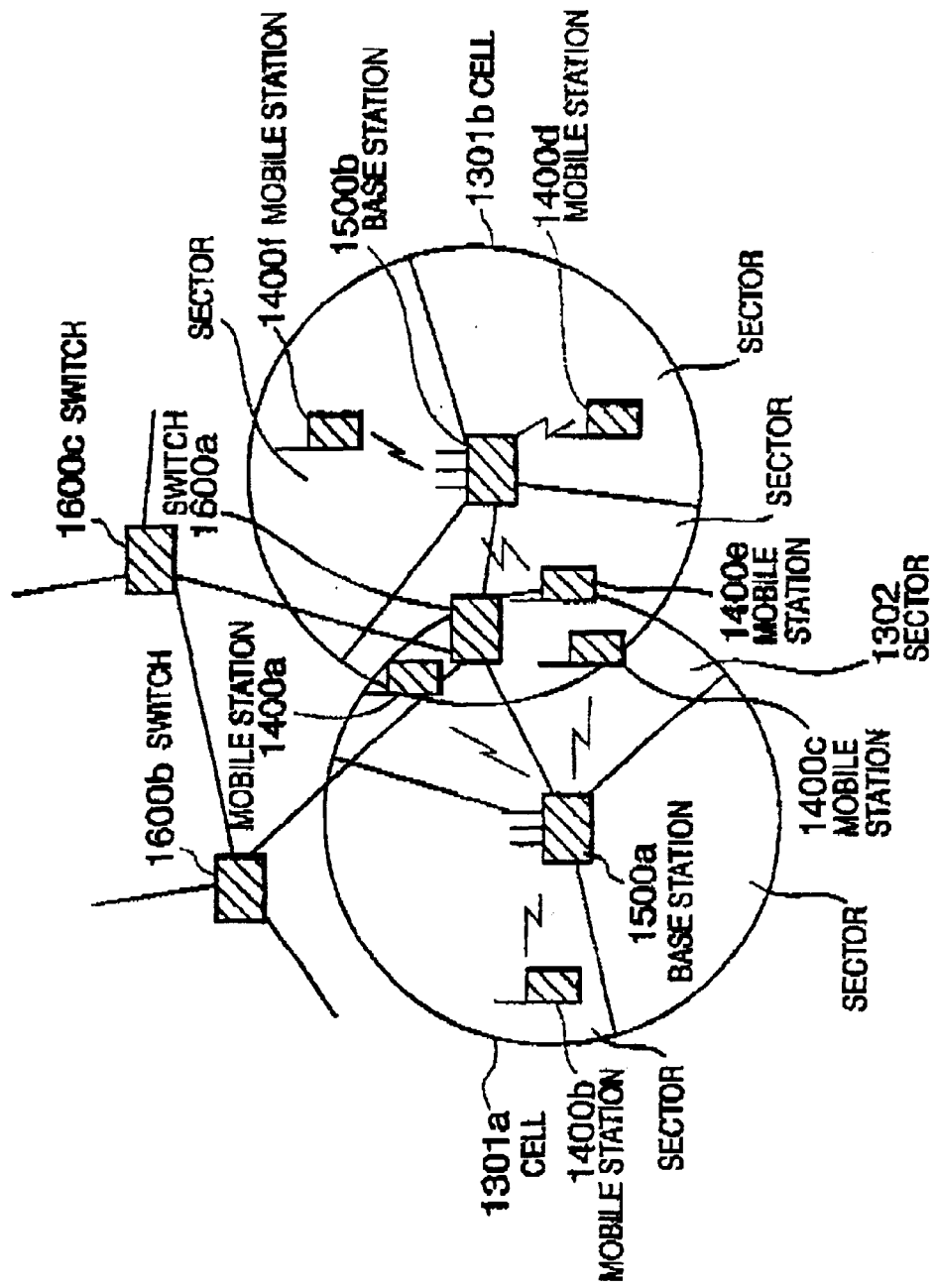
FIG. 13 is a block diagram showing a conceptual configuration of a CDMA mobile communication system to which the present invention is applied.
Figure 14:
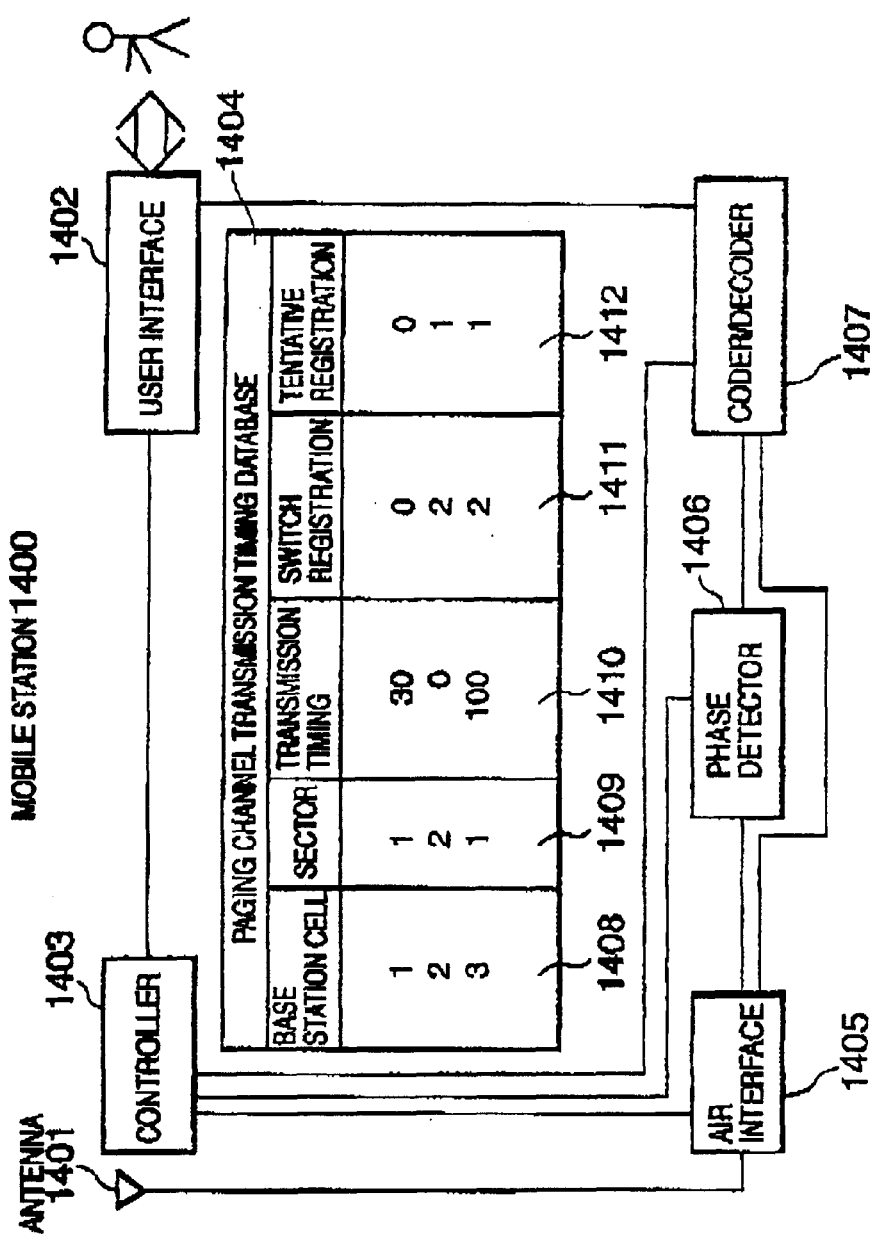
FIG. 14 is a block diagram showing a configuration of a mobile station according to one embodiment of the present invention.
Figure 15:
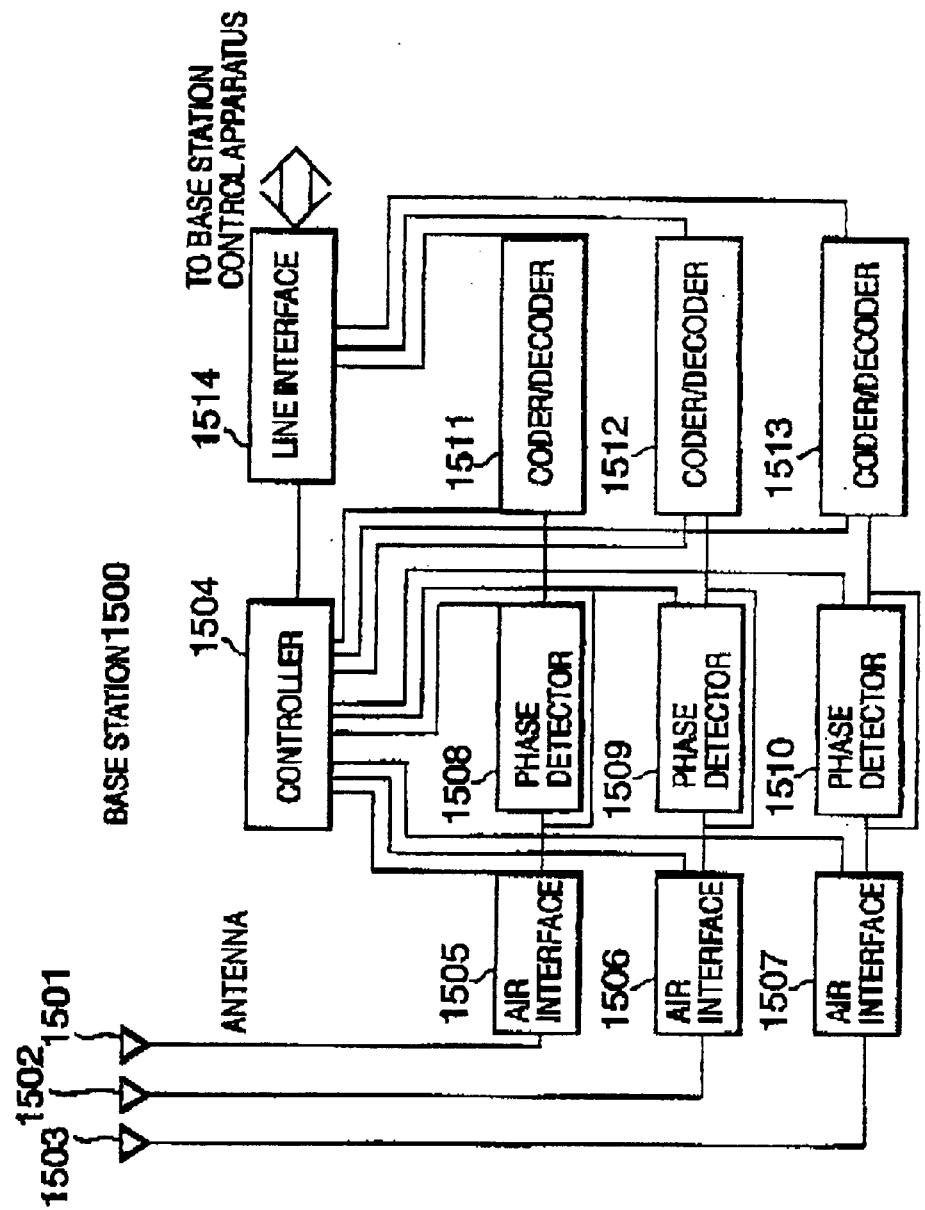
FIG. 15 is a block diagram showing a configuration of a base station according to one embodiment of the present invention.
Figure 16:
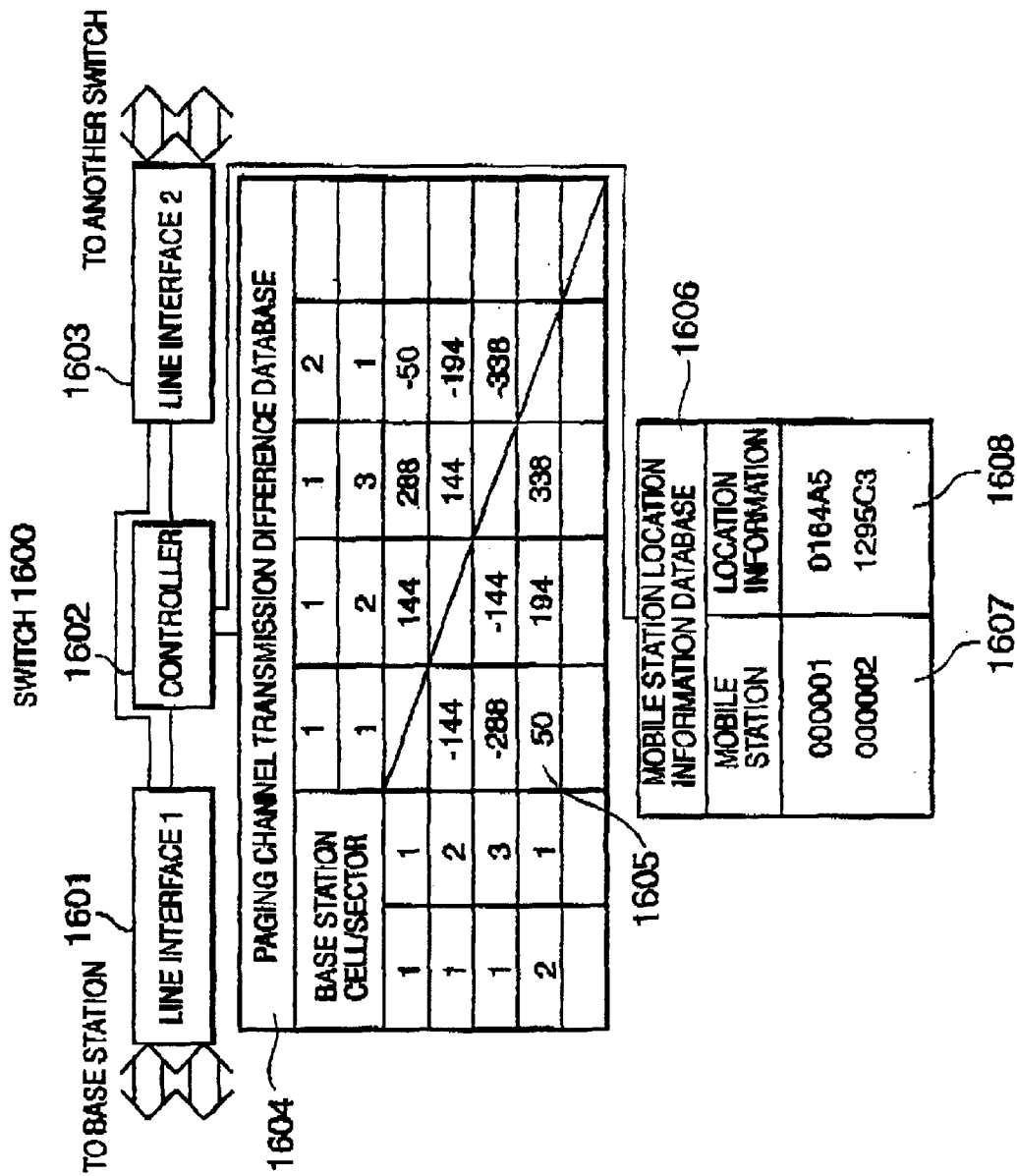
FIG. 16 is a block diagram showing a configuration of a switch according to one embodiment of the present invention.
Figure 17:
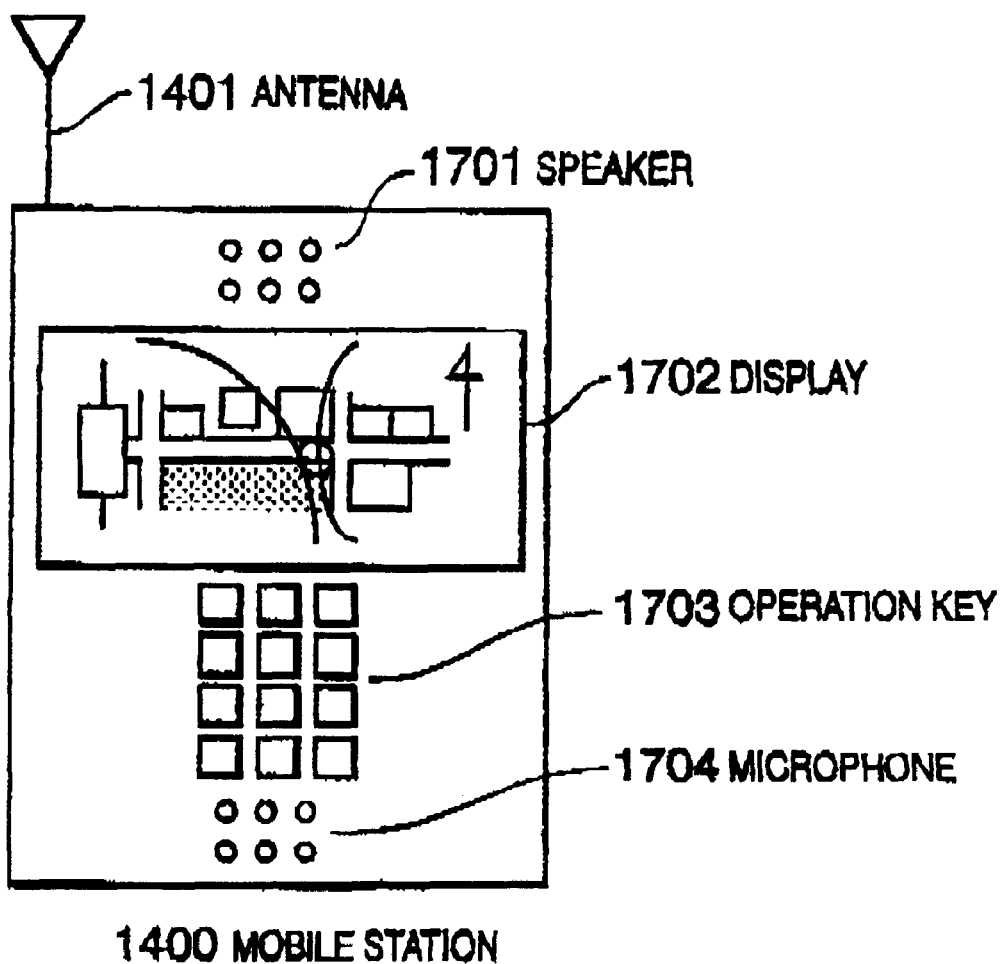
FIG. 17 is a view for explaining an appearance of a mobile station according to one embodiment of the present invention.
Figure 18:
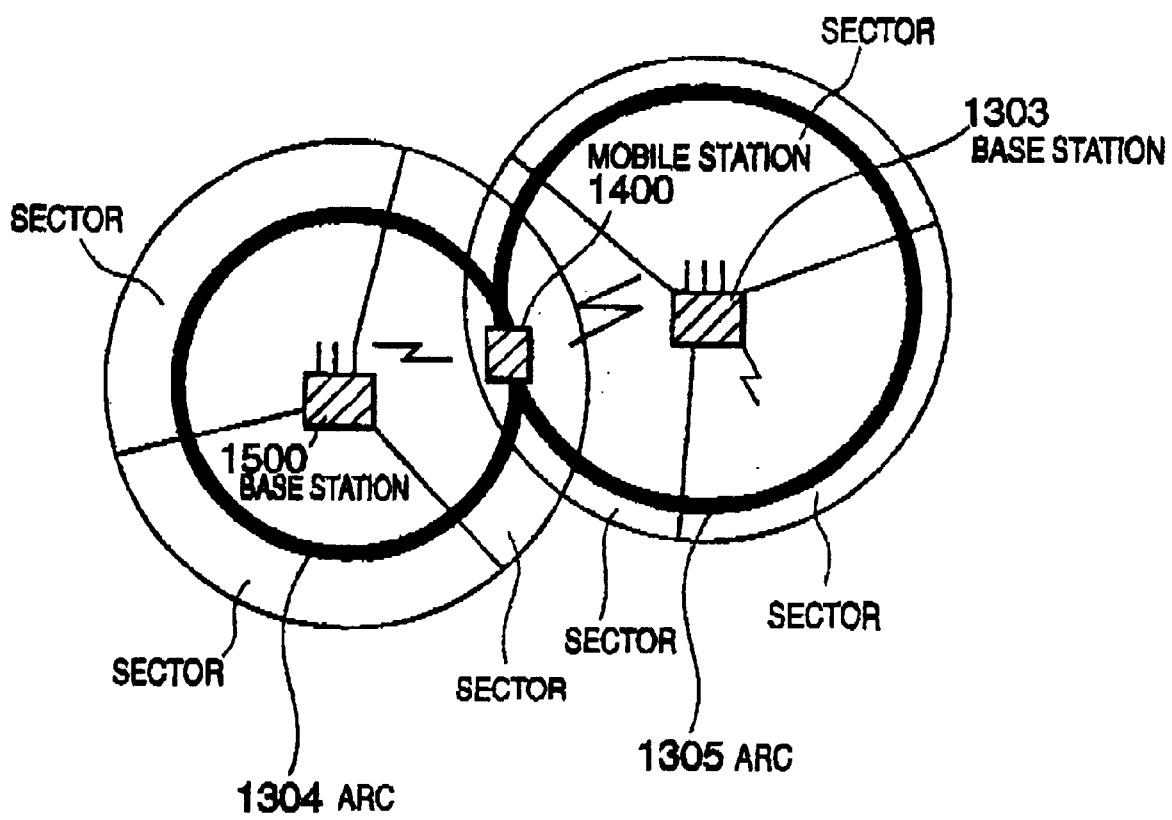
FIG. 18 is a view for explaining a principle of obtaining location information of a mobile station.
Figure 19:
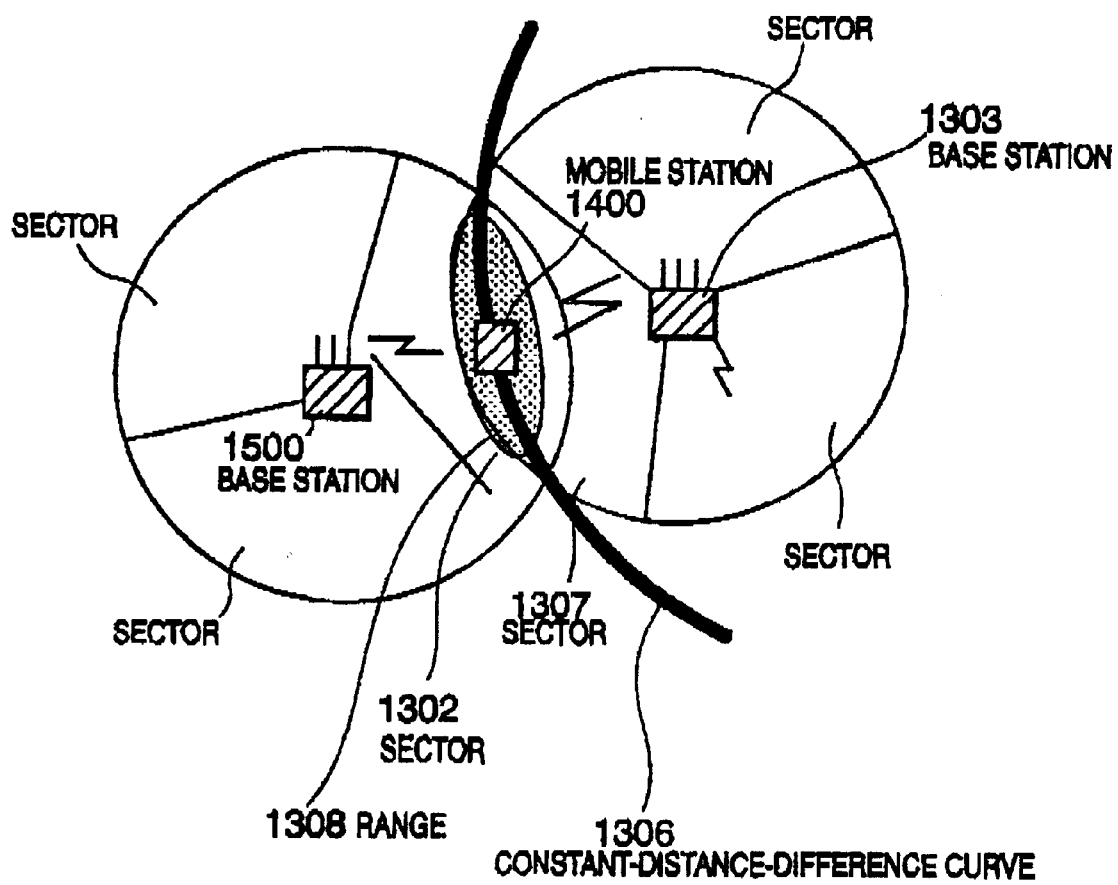
FIG. 19 is a view for explaining a principle of obtaining location information of a mobile station.

FIG. 1 is a flowchart for explaining a main procedure in a mobile station according to an embodiment of the present invention. FIGS. 2, 3, and 4 are flowcharts for explaining examples of a procedure for obtaining paging channel transmission timing in FIG. 1. FIGS. 5 and 6 are flowcharts for explaining examples of a procedure for calculating paging channel propagation delay information in FIG. 1. FIG. 7 is a flowchart for explaining a procedure for recording paging channel transmission timing difference in a mobile station according to an embodiment of the present invention. FIG. 8 is a flowchart for explaining a procedure for transmitting a paging channel in a base station according to an embodiment of the present invention. FIGS. 9, 10 and 11 are flowcharts for explaining base station's procedures corresponding to the mobile station's procedures shown in FIGS. 2, 3 and 4. FIG. 12 is a flowchart for explaining a switch's procedure corresponding to the mobile station's procedure shown in FIG. 7. FIG. 13 is a block diagram showing a conceptual configuration of a CDMA mobile communication system to which the present invention is applied. FIG. 14 is a block diagram showing a configuration of a mobile station according to one embodiment of the present invention. FIG. 15 is a block diagram showing a configuration of a base station according to one embodiment of the present invention. FIG. 16 is a block diagram showing a configuration of a switch according to one embodiment of the present invention. FIG. 17 is a view for explaining an appearance of a mobile station according to one embodiment of the present invention. FIGS. 18 and 19 are views for explaining principles of obtaining location information of a mobile station. And, FIG. 20 is a timing chart for explaining a relation between transmission and reception timings for respective channels and for explaining a principle of obtaining channel propagation delay differences and transmission timing. In FIGS. 13–17, a reference numeral 1301 refers to a cell, 1302 to a sector, 1400 to a mobile station (MS), 1401 and 1501–1503 to antennas, 1402 to a user interface, 1403, 1504 and 1602 to controllers, 1404 to a paging channel transmission timing database, 1405 and 1505–1507 to air interfaces, 1406 and 1508–1510 to phase detectors, 1407 and 1511–1513 to coder/decoders, 1500 to a base station, 1514, 1601 and 1603 to line interfaces, 1600 to a switch, 1604 to a paging channel transmission timing difference database, 1606 to a mobile station location information database, 1701 to a speaker, 1702 to a display, 1703 to an operation key, and 1704 to a microphone.

As shown in FIG. 13, the CDMA mobile communication system to which the present invention is applied is constructed to include a plurality of mobile stations 1400–1400f, a plurality of base stations 1500, and a plurality of switches 1600. A base station 1500 has a cell 1301 of a generally circular shape as a radio area within which that base station can offer services to mobile stations 1400a. In the example shown, the cell 1301 is divided into and consists of three fan-shaped sectors 1302. The mobile station 1400a shown in the figure belongs to the sector 1302 of the cell 1301a of the base station 1500a, and, at the same time, belongs to the sector of the cell 1301b of the adjacent base station 1500b. As the mobile station 1400a moves, it changes the cell and sectors to which it belongs, and changes the base station as the communication partner depending on the cell and sector to which the mobile station belongs at that moment.

As shown in FIG. 14, the mobile station 1400 comprises an antenna 1401, a user interface 1402, a controller 1403, a paging channel transmission timing database 1404 provided in a memory within the controller 1403 or an external memory (not shown) that can be accessed from the controller, an air interface 1405, a phase detector 1406, and a coder/decoder 1407.

In the mobile station 1400 shown in FIG. 14, the coder/decoder 1407 has functions of coding a transmission channel with a signal sequence called a diffusion code characteristic to the CDMA system and of decoding a received channel with the same diffusion code as one used by a transmitter to code the transmission channel. The channel that has been coded with a diffusion code has a periodic structure, and decoding of this channel requires phase information for decoding in accordance with the periodic structure of this channel, in addition to the diffusion code used for coding. The phase detector 1406 is for detecting the phase information of this received channel. There are two methods for the phase detector 1406 to detect the phase information of the received channel.

A first method is one of optionally searching within a channel cycle to detect the phase information of the received channel. This method is employed only when a paging channel is received. In the present specification, a paging channel is a signal for specifying a base station and that signal is required for making radio communication between the base station and a mobile station. By receiving this paging channel, a mobile station can know which base station accommodates that mobile station. A second method is one in which, when the phase information designated by the transmitting side is known in advance and a predicted value of the phase information of the received channel to be detected can be obtained, the phase information of the received channel is detected by carrying out the detection centering about this predicted value and correcting the error. This method is used when a communication channel other than the paging channel is received.

The air interface 1405 and the antenna 1401 are for transmitting and receiving a coded channel over the air. The controller 1403 carries out various controls to make ordinary communication and to obtain location information of the mobile station. The user interface 1402 is used by a user to input data and to operate the mobile station, and provides various outputs including presentation of location information to the user. Further, the paging channel transmission timing database 1404 is a database storing base station cell numbers 1408, sector numbers 1409, paging channel transmission timings 1410, switch registration information 1411, and tentative registration information (flags) 1412.

As shown in FIG. 15, a base station 1500 comprises antennas 1501–1503, a controller 1504, air interfaces 1505–1507, phase detectors 1508–1510, coder/decoders 1511–1513, and a line interface 1514. The coder/decoders 1511–1513, the phase detectors 1508–1510, the air interfaces 1505–1507, and the antennas 1501–1503 have the similar functions of the corresponding components of the mobile station 1400, each component being provided in a set of three. This is because one cell consists of three sectors, and those components are provided to correspond to respective sectors. Namely, when a cell consists of a plurality of sectors, the base station transmits respectively different paging channels for the sectors, and setting of other communication channels and transmission/reception are carried out for each sector separately. Further, the line interface 1514 has a function of communicating with a switch as a base station control apparatus.

In the above-described mobile station and base station, the controllers 1403, 1504 provided to those stations receive a report on received channel phase information from the phase detectors 1406, 1508–1510, and instruct the coder/decoders 1407, 1511–1513 about transmission channel coding start timing. At this time, the received channel phase information and the transmission channel coding start timing are expressed in terms of a phase relative to a reference cycle measured by the respective controller 1403 and 1504 of the mobile station 1400 and the base station 1500. Those values are used respectively as the reception timing and transmission timing relating to the present invention.

As shown in FIG. 16, the switch 1600 comprises line interfaces 1601, 1603, a controller 1602, a paging channel transmission timing difference database 1604, and a mobile station location information database 1604, those databases being stored in a memory within the controller or an external memory (not shown) that can be accessed from the controller.

The line interfaces 1601, 1603 have a function for the switch 1600 to communicate with a base station 1500 or an adjacent other switch or another network such as a fixed network. The paging channel transmission timing difference database 1604 records information on transmission timing differences between paging channels between sectors of the cells of the base stations, into a transmission timing difference record area 1605. Further, the mobile station location information database 1606 records mobile station numbers relating to mobile stations whose location information has been obtained in the switch 1600, and their location information, relating those numbers and location information to each other, into a recording area of mobile station numbers 1607 and a recording area of location information 1608, respectively.

An appearance of the mobile station 1400 is shown in FIG. 17. As shown in FIG. 17, the mobile station 1400 is provided with a speaker 1701, a display 1702, operation keys 1703, and a microphone 1704. All these correspond to the user interface 1402 described referring to FIG. 14.

Next, referring to the flowcharts shown in FIGS. 1–12, processing operations of various parts of the mobile station shown in FIG. 14, the base station shown in FIG. 15, and the switch shown in FIG. 16 will be described.

First, referring to the flowchart of FIG. 8, processing operation in the base station 1500 for transmitting a paging channel will be described.

(1) To the coder/decoders 1511–1513, the controller 1504 of the base station 1500 designates a diffusion code and transmission timing for a paging channel and diffusion codes and reception timings of communication channels from the respective mobile stations to the base station 1500. Here, as the paging channel transmission timing, on optional value can be designated. However, the reception timings from the mobile stations should be prescribed values based on the paging channel transmission timing. This will be described later (Step 800).

(2) Next, the controller 1504 informs the coder/decoders 1511–1513 about paging channel transmission contents including transmission source cell/sector numbers and a diffusion code and timing information for a reception channel from a mobile station 1400, and instructs the air interfaces 1505–1507 to start transmissions. The paging channel is coded through the coder/decoders 1511–1513, and thereafter, transmission from the air interfaces 1505–1507 using the antennas 1501–1503 is started. From that time on, the base station 1500 continues to transmit the paging channel in a constant cycle (Step 801).

Next, referring to the flowchart shown in FIG. 1, processing operation in the mobile station 1400 will be described. The mobile station operates when it receives the paging channel from the base station.

(1) The controller 1403 of the mobile station 1400 instructs the air interface 1405 to start receiving the paging channel from the base station 1500. The air interface 1405 receives the paging channel through the antenna 1401, and delivers the information of the received paging channel to the phase detector 1406. At that time, the controller 1403 designates a predetermined plurality of diffusion codes for paging channels, for the phase detector 1406 and the coder/decoder 1407, in preparation for later acquisition of paging channel reception timing and information contained in the paging channel. This designation is carried out at the same time with or prior to instructing the air interface 1405 to start receiving the paging channel (Step 100).

(2) Next, the phase detector 1406 carries out phase detection on the paging channel using the diffusion code designated by the controller 1403, and delivers the detected phase information and the paging channel to the coder/decoder 1407. At the same time, the phase detector 1406 detects the leading timing of the paging channel cycle according to a sequence of the plurality of diffusion codes, and reports this timing, as the paging channel reception timing, to the controller 1403. The coder/decoder 1407 uses the phase information delivered from the phase detector 1406 and the diffusion code designated by the controller 1403, to decode the paging channel delivered also from the phase detector 1406, and delivers the decoded paging channel to the controller 1403. Then, the controller 1403 obtains the information contained in the paging channel such as the cell/sector numbers of the base station as the transmission source of that paging channel (Step 101).

(3) Next, the controller 1403 uses the cell number 1408 and the sector number 1409 of the base station, as keys to retrieve the cell/sector of the base station as the transmission source of the paging channel, from the paging channel transmission timing database 1404. Thus, the controller 1403 investigates if the cell/sector of the base station as the transmission source of that paging channel have been registered in the paging channel transmission timing database 1404 (Steps 102, 103).

(4) When, as a result of the investigation in Step 103, the cell/sector of the base station are proved to be non-registered, then, the controller 1403 registers the cell/sector numbers of this base station into the base station cell numbers 1408 and the sector numbers 1409 of the paging channel transmission timing database 1404. At this time, the transmission timing 1410 of the paging channel is kept empty (Step 104).

(5) After the process of Step 104, or when the result of the investigation confirms the registration, the controller 1403 refers to the result of the retrieval from the paging channel transmission timing database in Step 103, to investigate if the transmission timing of the received paging channel has been registered or not. Usually, updating of the paging channel transmission timing that has been already registered it not necessary. However, in the present invention, updating of the paging channel transmission timing can be carried out easily, accompanying the processes for making ordinary communication, as will be described below. Accordingly, for example, when the precision of the reference cycle is considered to be insufficient for long time continuous use, and this investigation is carried out at a point of time when a process is under execution while updating of the paging channel transmission timing can be carried out accompanying it, then it may be decided to update the paging channel transmission timing (Step 105).

(6) When, as a result of the investigation in Step 105, the paging channel transmission timing is proved to be non-registered, or when the judgement of updating is made, then, the various parts of the mobile station 1400, the base station 1500, and the switch 1600 cooperate to carry out a procedure for the mobile station to obtain the paging channel transmission timing. With respect to detail of this procedure, there are three variations, as will be described below (Step 106).

(7) After the process of Step 106, or when the result of the investigation in Step 105 confirms the registration and there is no need of updating, then, the controller 1403 of the mobile station 1400 uses the transmission timing information obtained in the procedure of Step 106 for obtaining the paging channel transmission timing, or the transmission timing information recorded in the paging channel transmission timing database, in order to carry out a procedure for calculating a paging channel propagation delay or propagation delay difference. The procedure of calculating the propagation delay and the procedure of calculating the propagation delay difference will be described later (Step 107).

(8) Next, the control part 1403 calculate the distance from the transmission source base station, based on the paging channel propagation delay, or calculates difference in distances from the transmission source base stations, based on the propagation delay difference. Acquisition of distance or distance difference from propagation delay or propagation delay difference can be easily carried out using the relation of "distance=velocity of light×propagation delay". The distance calculated here shows that the mobile station exists in either a location on an arc 1304 within a cell centering at a paging channel transmission source base station 1500 or a location on an arc 1305 within a cell centering at a paging channel transmission source base station 1303, as shown in FIG. 18. Further, the distance difference shows that the mobile station exists in either location on a constant-distance-difference curve 1306 that is constant with respect to the difference between distances from respective transmission source base stations 1500, 1303 for two paging channels. In this case, it is also provided to limit a range 1308 on the constant-distance-difference curve 1306 (Step 108).

(9) Next, the controller 1403 uses a distance from a base station or a distance difference between distances from a plurality of base stations and a map or geographic information such as coordinates of each base station, in order to obtain the location information of the mobile station 1400. The controller 1403 delivers the location information of the mobile station to the user interface 1402 and instructs the user interface 1402 to output it. The user interface 1402 outputs the location information using one of or both the display 1702 and the speaker 1701 (Steps 109, 110).

In a display example of the display 1702 of the mobile station shown in FIG. 17, the location of the mobile station 1400 is indicated by O-mark on a map. To make such a display, the controller 1403 may previously retain map information on areas in which a user may use the mobile station and coordinates of each base station in the neighborhood. And, in the process of the above-described Step 109 for obtaining the location information of the mobile station, the distances or distance differences from the base stations and the coordinates of the base stations are used to overlay the above-mentioned arcs or constant-distance-difference curve on the map information, and then, the location information is obtained as a result of a process of specifying the location of the mobile station on the map.

Thus-described method requires at least two of arcs and/or constant-distance-difference curves, in total. However, as shown in FIGS. 18 and 19, it is possible to employ a method in which information on cover areas and directions of sectors is held further by the controller 1403 and overlaid on the map similarly, so that even single arc or constant-distance-difference curve specifies the location of the mobile station. Or, in another method, a switch 1600 may retain coordinates of each base station under its control, information on cover areas and directions of the sectors, and map information about the circumference of the area including the base stations under its control. Then, the mobile station 1400 and the switch 1600 communicate with each other to calculate the location information. This method can be realized as follows. Namely, in the above-described method, the map information, the base station coordinate information and the like are retained in advance in the mobile station's controller 1403. The switch's controller 1602 to report the map information, base station coordinate information and the like when those pieces of information are required for calculation of location information. In addition, the mobile switch controller 1403 informs the switch's controller 1602 about propagation delay information or distance information. The switch's controller 1602 calculates the mobile station's location on the map, using this propagation delay information or the distance information and reports the result to the mobile station's controller 1403.

Further, mobile station location information may be managed on the side of the network for the reason of, for example, providing service based on the mobile station location information. Then, when the switch's controller 1602 acquires mobile station location information, the switch's controller directly records it into the mobile station location information database 1606. When the mobile station's controller 1403 obtains the mobile station location information, the result is reported to the switch's controller 1602, which then records the information into the mobile station location information database 1606, in addition to performing other procedures.

Next, detail of the above-mentioned procedure in Step 106 for the mobile station to obtain the paging channel transmission timing will be described giving three variations and referring to the flowcharts shown in FIGS. 2–4.

First, referring to the process flow shown in FIG. 2 with respect to the mobile station, detail of the procedure of the above-mentioned Step 106 will be described according to the first variation.

(1) When the process of Step 106 for obtaining the paging channel transmission timing is started, the controller 1403 of the mobile station 1400 designates the diffusion code and transmission timing for the coder/decoder 1407 and instructs the air interface 1405 to transmit. The air interface 1405 transmits this channel through the antenna 1401 (Step 200).

In this process, the diffusion code and transmission timing designated by the controller 1403 for the coder/decoder 1407 are as follows. First, the diffusion code is the mobile station transmission channel diffusion code obtained from the paging channel of the base station to which the mobile station 1400 is going to make transmission in the process of detecting the paging channel reception timing and its contents in Step 101. Further, the transmission timing is obtained as follows. Namely, a phase difference between the base station paging channel transmission timing obtained from the received contents of the same paging channel and the mobile station transmission channel reception timing is used together with the reception timing of the paging channel obtained at the same time as the transmission timing. Thus, the reception timing is shifted by the phase difference, to obtain the transmission timing in question. On the other hand, in the process of designating the reception timing in the base station 1500 in Step 800 described referring to FIG. 8, the reception timing is designated by shifting the paging channel transmission timing by the same phase difference.

Thus-described procedure is not specific to the present invention, but a common method of designating transmission/reception timing in a case where communication is carried out between a mobile station and a base station in an asynchronous CDMA mobile communication system. Here, the reason for such designation of transmission/reception timing in the mobile station and the base station will be described in the following.

The transmission/reception timing that the base station can designate is a phase relative to the reference cycle of the base station, and, on the other hand, the transmission/reception timing that the mobile station designates is a phase relative to the reference cycle of the mobile station. The phase difference between the reference cycle of the base station and the reference cycle of the mobile station may take any values since the base station and the mobile station are not synchronized with each other. For this reason, in order to uniformly arrange transmission/reception timings of the channels except for the paging channel, with respect to the actual time (namely, in order to synchronize the base station's reference timing with the mobile station's reference timing), the following operation is required, for example.

Namely, a phase difference of a certain value is commonly owned by the mobile station and the base station. As the transmission/reception timing of the mobile station, there is used a value obtained by shifting the paging channel reception timing by a phase difference corresponding to the propagation delay shown in FIG. 20 (4). As the transmission/reception timing of the base station, there is used the value of the paging channel transmission timing.

FIG. 20 shows relations of respective reference cycles of the base station and the mobile station with the transmission/reception timing of the paging channel and a communication channel transmitted from the mobile station to the base station. As shown in FIG. 20, the reference operation clocks of the base station and the mobile station and each channel have the same cycle with respective individual phases, and phase differences between those phases are not known as described above. However, when the base station's transmission timing of the paging channel and the reception timing for the mobile station to receive the paging channel from the base station are determined, those channels can be regarded as generally-synchronized timing although they have variable errors corresponding to the propagation delay of the paging channel between the base station and the mobile station. This can be taken as the reference timing for designating transmission/reception timing of each communication channel in the mobile station and base station. The above is why the transmission/reception timing in the mobile station and the base station is designated based on the transmission/reception timing of the paging channel.

(2) The communication channel transmitted from the mobile station in the process of Step 200 is received by the base station. The procedure of the base station shown in FIG. 9 is started. Namely, one of the air interfaces, for example the air interface 1505, corresponding to the base station's cell/sector as the destination of the mobile station, and the phase detector 1508 receive the channel from the mobile station through the antenna 1501 (Step 900).

As shown in the timing chart of FIG. 20 (6), the reception timing of the actual communication channel in the base station becomes timing that is delayed by a phase corresponding to the sum total of a propagation delay of the paging channel transmitted from the base station to the mobile station with the reception timing designated by the base station (FIG. 20 (4)), a propagation delay of the mobile station transmission channel transmitted from the mobile station to the base station (FIG. 20 (6)), and timing required by the mobile station between the reception of the paging channel from the base station and the transmission of the communication channel to the base station (FIG. 20 (5)). Accordingly, the phase detector 1508 corrects this before reception.

The phase detector 1508 reports the actual reception timing to the controller 1504. The controller 1504 compares the reception timing from the mobile station in the process of Step 800 described referring to FIG. 8 (as shown in FIG. 20 (2), the paging channel transmission from the base station is designated as the reception timing of the communication channel from the mobile station) with the actual reception timing, to obtain the forward-and-return propagation delay between the base station and the mobile station contained in the actual reception timing (Step 901).

See FIG. 20 (7).

The phase difference between the base station paging channel transmission timing and the mobile station transmission channel reception timing=known phase difference (timing required for the mobile station from receiving the paging channel from the base station to transmitting the communication channel to the base station)+the propagation delay=2

(3) Next, the controller 1504 informs the mobile station's controller 1403 about the propagation delay obtained in Step 901. Here, as the propagation delay, the controller 1504 reports an one-way propagation delay obtained by dividing the forward-and-return propagation delay by 2. When a channel different from the paging channel is used for this reporting, it is necessary that the diffusion code and the transmission timing are designated for the coder/decoder 1511 and a transmission instruction is given to the air interface 1505. In this case, prior to the process of receiving the propagation delay in the below-described Step 201, it is necessary that the mobile station designates the diffusion code and the reception timing to the phase detector 1406 and the coder/decoder 1407 and instructs the air interface 1405 to start receiving. It is also necessary that the diffusion code and phase difference for the paging channel transmission/ reception timing are included in the contents of the paging channel for example, in order to make them consistent between the base station and the mobile station (Step 902).

(4) Next, the controller 1403 of the mobile station 1400 obtains the propagation delay sent in the above-described Step 902 in the base station, and removes this propagation delay from the paging channel reception timing, to obtain the paging channel transmission timing relative to the mobile station's reference cycle. As shown in FIG. 20, this paging channel transmission timing coincides with the paging channel transmission timing at the time of the transmission in the base station, and does not change. Accordingly, the once-obtained value can be used as it is from that time on, as long as the reference cycles and the paging channel cycles are exactly same between the mobile station and the base station (Steps 201, 202).

(5) Next, in the case that the paging channel transmission source base station cell/sector numbers are newly registered or updated in the process of Step 104 described referring to FIG. 1, the controller 1403 records the above-mentioned paging channel transmission timing into the paging channel database 1404, as the transmission timing 1410 corresponding to the base station cell number 1408 and the sector number 1409. Those base station cell number 1408 and the sector number 1409 has been obtained in the process of retrieving the paging channel transmission source base station cell/sector numbers in Step 103 (Step 203).

The above describes the detail of the processing according to the first variation of Step 106 for obtaining the paging channel transmission timing. However, transmission/reception that employs such procedure and terminates at the mobile station and the base station and the measurement of the propagation delay in that transmission/reception are common communication procedures in the asynchronous CDMA mobile communication system, and carried out for setting a communication channel for user data, for example. For this reason, the acquisition of the location information of the mobile station for the present invention can be carried out accompanying the common processing. Thus, it can be carried out very efficiently, suppressing the load of the processing and use of radio resource.

Next, referring to the process flow shown in FIG. 3 with respect to the mobile station and the process flow shown in FIG. 10 with respect to the base station, detail of the procedure of the above-mentioned Step 106 according to the second variation will be described.

According to the second variation, the procedure of the above-mentioned Step 106 can be carried out when a channel synchronizing process is under execution. For example, when, for a channel expected to carry out continuous transmission/reception, such as a user data communication channel, phasing between a mobile station and a base station is carried out with respect to transmission/reception timing before starting that transmission/reception and the phased state is maintained until the end of the communication, then, the channel synchronizing process is the mentioned phasing process that is carried out before starting the transmission/reception. The process of soft hand-over is characteristic to the CDMA mobile communication system. In that process, channels of a plurality of cells/sectors are synthesized as a whole into one channel in the neighborhood of a boundary between cells/sectors, etc. and synchronization is carried out for each channel called hand-over branch which is the object of the synthesis. The procedure according to the second variation described below is particularly suitable for carrying out accompanying the synchronizing process for hand-over branches.

(1) It is assumed that, when the process of Step 106 for obtaining the paging channel transmission timing is going to be started, the mobile station and the base station carry out the synchronizing process for hand-over branches in Steps 300 and 1000, as described above. At this time, the controller 1504 of the base station designates a diffusion code and transmission/reception timing for the air interface 1506, the phase detector 1509, and the coder/decoder 1512. These diffusion code and transmission/reception timing are the values that have been arranged uniformly with the mobile station 1400 in advance. Similarly to the procedure of the first variation, the transmission/reception timing is designated based on the transmission/reception timing of the paging channel. At the same time with establishment of synchronization, the phase detector 1509 and the coder/decoder 1512 start to receive the channel (Step 1001).

(2) Next, the controller 1504 of the base station obtains the actually-received reception timing from the phase detector 1509, and compares this actual reception timing with the reception timing designated for the synchronizing process, to obtain a propagation delay. Thus, the forward-and-return propagation delay between the mobile station and the base station can be obtained on the same grounds as the procedure of the first variation (Step 1002).

(3) Next, the controller 1504 of the base station informs the mobile station's controller 1403 of the propagation delay. This can be carried out using the channel for which synchronization has been established, without using a dedicated communication channel, and accordingly, without occupying the radio resources corresponding to the dedicated communication channel. In a case where the channel terminates at the mobile station and the switch, for example, when the switch synthesizes hand-over branches that extend through a plurality of base station cells by the soft hand-over, the base station's controller 1504 can report this to the mobile station's controller 1403 through the switch's controller 1602 (Step 1003).

(4) From that time on, the controller 1403 of the mobile station 1400 executes processes of receiving the propagation delay time, calculating the paging channel transmission timing, and registering it into the database in Step 1003, similarly to the above-described Steps 201–203 of the procedure according to the first variation (Step 301–303).

Thus, according to the second variation, detail of the process of Step 106 for the mobile station to obtain the paging channel transmission timing has been described. Transmission/reception terminating at the mobile station and the base station using thus-described procedure, and the measurement of the propagation delay in that transmission/reception are carried out accompanying an ordinary procedure, similarly to the procedure of the first variation. Accordingly, it is possible to suppress the processing load and radio resources. In particular, since the synchronizing process of hand-over branches is often carried out when a new paging channel is received, the above-described procedure that can be executed together with that process is very practical.

Next, referring to the process flow shown in FIG. 4 for a mobile station and the process flow shown in FIG. 11 for a switch, detail of the procedure of the above-mentioned Step 106 according to a third variation will be described. This procedure of the above-mentioned Step 106 according to the third variation reinforces the procedures of the first and second variations.

(1) First, in the mobile station, the controller 1403 judges if a usable communication channel has been set between the mobile station and the switch. The procedure described here is one accompanying communication between the mobile station and the switch. When a new channel is to be set, the above-mentioned first and second variation procedures can be executed in the course of setting a new channel. Thus, the present process is executed only in a case where a communication channel has been set already (Step 400).

(2) Next, the controller 1403 searches the paging channel transmission timing database 1404 to judge if there is a paging channel whose transmission timing has been registered, among the paging channels received this time (Step 401).

(3) In a case where the search in Step 401 shows existence of a registered paging channel, the controller 1403 informs the switch's controller 1602 of the respective cell/sector numbers or transmission source base stations, with respect to this registered paging channel and with respect to the paging channels of unknown transmission timings (Step 402).

(4) On the other hand, when, as a result of the search, there is not a registered paging channel, the controller 1403 informs the switch's controller 1602 of respective transmission source base station cell/sector numbers with respect to the paging channels whose transmission timings are not known (Step 403).

(5) The switch's controller 1602 receives the paging channel transmission source base station cell/sector numbers sent from the mobile station in Steps 402 and 403, and investigates if they include a paging channel whose transmission timing has been registered in the mobile station 1400 (Steps 1100, 1101).

(6) When the investigation of Step 1101 shows that satisfactory base station cell/sector numbers are contained, then, the controller 1602 searches the transmission timing difference record area 1605 of the paging channel transmission timing difference database 1604. This search is carried out to investigate if there is registered a base station cell/sector whose transmission timing difference from the base station cell/sector in question has been recorded and whose transmission timing has not been registered in the mobile station (Steps 1102, 1103).

(7) When the investigation in Step 1103 shows that such a base station cell/sector has been registered, the controller 1602 records that paging channel transmission timing difference and the corresponding transmission source base station cell/sector numbers as contents of a report to the mobile station (Step 1104).

(8) After processing of Step 1104, or when either condition of the investigations of Steps 1101 and 1103 is not satisfied, then, the controller 1602 searches the transmission timing difference record area 1605 of the paging channel transmission timing difference database 1604 with respect to all the combinations of receiving base station cell/sectors except for already-searched ones, in order to investigate if there is an already-registered combination (Steps 1105, 1106).

(9) When the investigation of Step 1106 shows an already-registered combination, the controller 1602 includes the respective base station cell/sector numbers of this combination and the retrieved paging channel transmission timing difference into the contents of the report to the mobile station. Then, the controller 1602 reports the contents that have been constructed until the previous step or empty information, to the mobile station's controller 1403 (Steps 1107, 1108).

(10) The mobile station's controller 1403 receives the transmission timing difference information sent from the switch in the process of Step 1108, and confirms whether there exist the report contents. As a result, when the report contents are empty information, then, the processing is ended (Steps 404, 405).

(11) When a transmission timing difference is included in the report contents in Step 405, the mobile station's controller 1403 investigates whether it is a transmission timing difference between a paging channel registered in the transmission timing database 1404 and a paging channel that has not been registered (Step 406).

(12) When the investigation in Step 406 shows that the transmission timing difference satisfies the condition, the mobile station's controller 1403 calculates the unknown transmission timing of the paging channel concerned, based on the transmission timing difference and the registered transmission timing. Then, the controller 1403 records the calculated transmission timing into the transmission timing 1410 of the database 1404 together with the base station cell number 1408 and the sector number 1409. At that time, the switch registration information 1411 is set to "1", and the tentative registration information 1412 is not flagged (Steps 408, 409).

(13) When the investigation of Step 406 shows that the transmission timing difference is obtained from unregistered paging channels without satisfying the investigation condition, either one of transmission timings is decided tentatively. Then, the other transmission timing is calculated from that tentative transmission timing and the transmission timing difference. Those transmission timings are recorded into the transmission timing 1410 of the database 1404 together with respective base station cell numbers 1408 and sector numbers 1409. At that time, any classification number that does not duplicate another number is recorded into the switch registration information 1411, and the tentative registration information 1412 is flagged. With respect to the group of paging channels expressed by the classification number of the switch registration information 1411 and the flag of the tentative registration information 1412, the transmission timings 1410 are rewritten into correct values when a transmission timing of some page channel belonging to that group becomes known. At that time, the switch registration information 1411 is set to "1" and the tentative registration information 1412 is unflagged (steps 407, 409).

With respect to the paging channel transmission timing obtained by the procedure according to the above-mentioned first or second variation, the initial value of the switch registration information 1411 of the transmission timing database 1404 is set to "0" meaning "unregistered". This is set to "1" meaning "registered", when a registration procedure is executed between the mobile station 1404 and the switch 1600 and the registration into the switch transmission timing difference database 1604 is completed. This procedure will be described below.

Thus, according to the third variation, detail of the processing of Step 106 for the mobile station to obtain the paging channel transmission timing has been described. Transmission/reception using such a procedure and terminating at the mobile station and the base station and measurement of the propagation delay in that transmission/reception are executed, first by judging whether a useable communication channel has been set between the mobile station and the switch, in Step 400. In other words, it is assumed that this process is carried out while user data or the like is being transmitted through the communication channel. Actually, such a channel often carries out soft hand-over described in connection with the second variation procedure.

In that case, the second variation procedure is used to obtain the transmission timing with respect to the paging channel of the base station cell/sector for which hand-over branches have been set, and the third procedure is used to obtain the transmission timing or the transmission timing difference with respect to the one other paging channels. By this, it is possible to obtain as many paging channels as possible, and to improve the accuracy of obtaining the location information of the mobile station later. On the other hand, so far as such situation is concerned, since execution of the first procedure sets both the original communication channel and the communication channel used in the first procedure, the third procedure is more effective than the first procedure, in terms of use of radio resources. This becomes remarkeable when the number of communication channels that the mobile station can use at the same time is limited.

Next, the mobile station's process flow shown in FIGS. 5 and 6 will be referred to, in order to describe detail of the procedure for obtaining the paging channel propagation delay and propagation delay difference in Step 107 that has been described referring to the flowchart of FIG. 1. First, referring to FIG. 5, a procedure for obtaining the page channel propagation delay will be described.

(1) When the process of Step 107 is started, the mobile station's controller 1403 searches the transmission timing database 1404, with respect to the received paging channel (Step 500).

(2) It is investigated whether the transmission timing has been found by the search in Step 500, and there does not exist a transmission timing, this processing is ended (Step 501).

(3) When a transmission timing is found in the investigation of Step 501, then, it is subtracted from the reception timing to obtain the propagation delay (Step 501).

Here, as the transmission timing used for the above-described procedure of FIG. 5, one for which the tentative registration information 1412 is not flagged can be used.

Next, referring to FIG. 6, a procedure for obtaining the paging channel propagation delay difference will be described.

(1) When the process of Step 107 is started, the mobile station's controller 1403 searches the transmission timing database 1404 with respect to the received paging channel, in order to obtain as many transmission timings as possible. Here, the obtained transmission timings are ones for which the tentative registration information 1412 is not flagged. Or, even if that information is flagged, it is sufficient that the classification number of the switch registration information 1411 is same for all the transmission timings (Step 600).

(2) Next, it is investigated whether two or more transmission timings are obtained in the process of Step 600. If it is negated, then the processing is ended. When two or more transmission timings are obtained, any one out of the obtained paging channels is selected as a reference paging channel (Steps 601, 602).

(3) Next, the paging channel propagation delay difference is obtained based on the transmission/reception timing of the reference paging channel and the respective transmission/reception timings of the other paging channels. Writing the transmission timing and the reception timing of the reference paging channel as Sb and Rb, respectively, and the respective transmission and reception timings of the other paging channels as Si and Ri, then, the propagation delay differences of these paging channels can be obtained as (Ri-Rb)−(Si-Sb). Accordingly, when values of the transmission timing differences have been obtained, the transmission timings themselves can be used in relative values (Step 603).

Next, construction of the transmission timing difference database 1604 of the switch used in the third variation procedure for obtaining the paging channel transmission timing will be described, referring to the mobile station's process flow shown in FIG. 7 and the switch's process flow shown in FIG. 12.

(1) During a process at the starting up in each base station, the switch's controller 1602 obtains paging channel transmission timing differences between sectors within the cell of the base station from the controller 1504 of the base station, and registers those paging channel transmission differences into the database (Steps 1201, 1202).

(2) The mobile station's controller 1403 executes the above-described first or second variation procedure for obtaining the transmission timing during the system's operation. After the mobile station obtains the transmission timing, the switch registration information 1411 of the transmission timing database 1404 is referred to, in order to investigate whether there exists a transmission timing difference that has not been reported to the switch. When there is not an unreported transmission timing difference, then the processing is ended without doing anything (Step 700).

(3) When the investigation of Step 700 shows an unreported transmission timing difference, then, it is investigated whether a usable communication channel has been set between the mobile station and the switch. When a usable communication channel has not been set, the processing is ended without doing anything (Step 701).

(4) When the investigation of Step 701 shows a usable communication channel, it is investigated whether there exist two or more such channels including one whose transmission timing has been reported and thus the difference can be calculated. If there does not exist such channels, then the processing is ended without doing anything (Step 702).

(5) When the investigation of Step 702 shows two or more channels including one whose transmission timing has been reported, then, the mobile station's controller 1403 performs the following operation, for reporting the paging channel transmission timing differences. Namely, the controller 1403 carries out classification into two cases based on whether there exist a paging channel whose transmission timing difference has been reported. When the result is affirmative, then, the one whose transmission timing difference has been reported is used as the reference paging channel. When there exist no such paging channel, then any unreported channel is selected as the reference paging channel (Steps 703–705).

(6) Next, respective transmission timing differences between unreported paging channels and the reference paging channel are calculated, and reported to the switch, together with the corresponding transmission source base station cell/sector numbers. Here, the above-mentioned classification is carried out, since, when the transmission timing that has been already reported to the switch 1600 is including in the objects of the transmission timing difference calculation, there is a good possibility that more relations with paging channel transmission timings of cells/sectors can be recorded (Steps 706, 707).

(7) Next, as a result of the process of Step 707, the switch's controller 1602 receives the report on the transmission timing differences from the mobile station, and updates the paging channel transmission timing difference database 1604. When reports from a plurality of mobile stations are received, updating is carried out by (a) giving priority to the first report, (b) giving priority to the last report, or (c) taking an average of the reports. All the part relating to the transmission timing difference 1605 becomes objects of updating (Steps 1203, 1202).

(8) Lastly, the mobile station's controller 1403 updates the switch registration information 1411 corresponding to the reported transmission timings 1410, into the value indicating "registered" (Step 708).

The above embodiment of the present invention has been described, in particular, taking the example in which the present invention is applied to an asynchronous CDMA mobile communication system between mobile stations and a base station. However, the present invention is not limited to this, and can be applied to a communication system that uses a communication channel whose structure is capable of setting and detecting a phase on the sending and receiving sides and through which transmissions are carried out periodically.

In the above, the present invention has been described based on the embodiments. However, the present invention is not limited to those embodiments, and can be variously modified without departing from the range of its gist, and without departing from the spirit and scope defined by the claims. The following disclose items that can be varied as mentioned.

As described above, according to the present invention, location information of a mobile station can be obtained accompanying transmission/reception for ordinary communication control or measurement of timing. Thus, it is possible to obtain location information of a mobile station, with loads on the processing or communication traffic being suppressed and use of radio resources being decreased. Further, by using a channel through which transmissions/receptions are made periodically, it is possible to obtain the newest location information of a mobile station, in short intervals.

What is claimed is:

1. A mobile communication system comprising mobile station, a base station and a switch, wherein:

said mobile and base stations, respectively, have a controller operating at a cycle that is common to said mobile and base stations wherein a phase of the cycle is optional for each station, as a reference cycle for each of said mobile and base stations;

said controller of said base station transmits a paging channel having a same cycle as the reference cycle through an air interface, the paging channel including information indicating a transmission source;

said controller of said mobile station receives the paging channel from said base station through an air interface, obtains a phase difference between the reference cycle of said mobile station and a cycle of the paging channel at a time of receiving, as a reception timing of the received paging channel, and obtains information indicating the transmission source of the paging channel, the information being included in said paging channel; and said controller of said mobile station transmits a communication channel to the base station, the communication channel having a same cycle as the reference cycle and having a phase whose phase difference from a reception timing of the paging channel from said base station at said mobile station becomes a reference value;

said base station has a receiver for receiving the communication channel from said mobile station;

said controller of said base station calculates a propagation delay of the paging channel and the communication channel, based on a reception timing of the communication channel at said base station, a transmission timing of the paging channel from said base station, and the reference value, and informs said mobile station of the propagation delay thus calculated; and said controller of said mobile station calculates the transmission timing of the paging channel from said base station, based on the propagation delay received from said base station and a reception timing of the paging channel from said base station at said mobile station.

2. The mobile communication system according to claim 1, further comprising a plurality of base stations, wherein said controller of said mobile station:

calculates a transmission timing difference between transmission timings of the paging channels from two of said base stations;

calculates a paging channel propagation delay difference, based on the transmission timing difference thus calculated and a corresponding reception timing difference; and calculates, as information on distance from said mobile station itself to said two of said base stations, distance differences between distances from said mobile station itself to respective said two of said base stations, based on the paging channel propagation delay difference.

3. The mobile communication system according to claim 2, wherein:

said controller of said mobile station:

selects, out of the transmission timings of the broadcast channels from said plurality of said base stations, a transmission timing of a first broadcast channel whose transmission timing difference is not informed and switch and a transmission timing of a second broadcast channel whose transmission source is different from a transmission source of said first broadcast channel;

calculates a transmission timing difference between the transmission timings thus selected; and informs the transmission timing difference thus calculated of said switch, and wherein said switch has a memory for storing the transmission timing difference.

4. The mobile communication system according to claim 1, wherein:

said controller of said mobile station;

obtains information on a broadcast channel transmission timing, the broadcast channel transmission timing being a phase difference between the reference cycle of said mobile station itself and a cycle of the broadcast channel of the base station at a time of transmission;

has a memory for storing the information on the broadcast channel transmission timing together with information indicating a transmission source of the broadcast channel;

calculates information on a propagation delay of the broadcast channel, based on information on a reception timing and the transmission timing of the broadcast channel, when said controller of said mobile station receives a broadcast channel for which information on a transmission timing is retained in advance, or newly obtains information on a transmission timing of a received broadcast channel; and calculates information on a distance between said mobile station itself and said base station, based on the information on the propagation delay of the broadcast channel and the information indicating the transmission source of the broadcast channel.

5. A mobile station configured to calculate its own location from a base station used in a mobile communication system employing a mobile station, a base station, and a switch, said mobile station comprising:

a controller operating at a reference cycle, said reference cycle being a cycle common to said base station although a phase of said cycle is optional, and wherein said controller of said mobile station;further configured to, define, as a reference timing, an actual reception timing of a paging channel at said mobile station itself, the paging channel specifying said base station and being transmitted in accordance with a reference cycle of said base station;

control said mobile station itself such that a communication channel is transmitted to said base station after a known phase difference from the reference timing;

receive data on a propagation delay between said base station and the mobile station itself, the propagation delay being calculated by said base station on receiving the communication channel from said mobile station; and calculate a transmission timing of the paging channel from said base station, based on the data on the propagation delay thus received and the reference timing.

6. The mobile station according to claim 5, wherein:

said controller calculates information on a distance between said mobile station itself and said base station, based on the information on the propagation delay of the broadcast channel and the information indicating the transmission source of the broadcast channel.

7. The mobile station according to claim 6, wherein:

said controller receives paging channels from a plurality of said base stations, and calculates the location of said mobile station itself, based on respective distances from said base stations.

8. A base station that is used in a mobile communication system having a mobile station, a base station, and a switch, and that calculates a distance from a mobile station, said base station comprising:

a transmitter configured to transmit, as a paging channel, information for specifying said base station itself for communicating with said mobile station within a communication area of said base station and information for specifying a communication channel transmission timing of said mobile station; and a receiver configured to receive the information channel from said mobile station that has received the paging channel; calculates a propagation delay, based on a reception timing of receiving the communication channel, a transmission timing of the paging channel, and a transmission timing of the communication channel of said mobile station: and informs said mobile station of this calculated propagation delay.

9. The base station according to claim 8, wherein:

the information for specifying the communication channel transmission timing expresses a constant timing from a reception timing of said mobile station for receiving a paging channel from said base station until transmission of the communication channel.

* * * * *